(12) United States Patent
Hemsing et al.

(10) Patent No.: US 7,089,390 B2
(45) Date of Patent: Aug. 8, 2006

(54) APPARATUS AND METHOD TO REDUCE MEMORY FOOTPRINTS IN PROCESSOR ARCHITECTURES

(75) Inventors: Craig Hemsing, W. Vancouver (CA); Dave Hylands, Brunaby (CA); Andrew Jones, Vancouver (CA); Henry W. H. Li, Vancouver (CA); Susan Pullman, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 622 days.

(21) Appl. No.: 10/003,563

(22) Filed: Oct. 24, 2001

(65) Prior Publication Data
US 2004/0015923 A1 Jan. 22, 2004

Related U.S. Application Data

(60) Provisional application No. 60/269,378, filed on Feb. 16, 2001.

(51) Int. Cl.
*G06F 12/00* (2006.01)
(52) U.S. Cl. .......................................... 711/170; 711/2
(58) Field of Classification Search ................ 711/170, 711/2; 710/113; 345/423, 501; 379/245
See application file for complete search history.

(56) References Cited

U.S. PATENT DOCUMENTS 3,775,566 A * 11/1973 Akimaru et al. ............ 379/245
4,779,191 A * 10/1988 Greenblatt .................... 711/2
5,123,098 A * 6/1992 Gunning et al. ............... 711/2

(Continued)

FOREIGN PATENT DOCUMENTS

EP 0817096 A 1/1998

OTHER PUBLICATIONS

Merriam-Webster, Incorporated, 1997, Merriam-Webster's Collegiate Dictionary, Tenth edition, p. 323.*

(Continued)

*Primary Examiner*—Nasser Moazzami
(74) *Attorney, Agent, or Firm*—McAndrews, Held & Malloy

(57) ABSTRACT

The present invention provides an apparatus and method to reduce the memory footprint of a processor architecture by structuring processor code to be stored in an external device, and transferring into the processor certain code and associated data as it is needed. The processor code or algorithm is divided into a controlling piece and a working piece. The controlling piece can be located on a low-MIPS, high memory-footprint device, whereas the working piece can be located on a high-MIPS, low memory-footprint device. The working piece can also be broken down into phases or segments, which are put in a data store. The segments are then transferred, on an as-needed basis along with associated data, from the store into the constrained memory of the low memory-footprint device. Transfer is facilitated by a segment manager which can be processed from the low-MIPS device, or alternatively from the high-MIPS device.

25 Claims, 14 Drawing Sheets

U.S. PATENT DOCUMENTS

| | | | | |
|---|---|---|---|---|
| 5,175,830 A | * | 12/1992 | Sherman et al. | 711/2 |
| 5,189,733 A | * | 2/1993 | Bennett et al. | 711/170 |
| 5,291,614 A | | 3/1994 | Baker et al. | |
| 5,604,849 A | * | 2/1997 | Artwick et al. | 345/423 |
| 6,385,678 B1 | * | 5/2002 | Jacobs et al. | 710/113 |
| 6,608,625 B1 | * | 8/2003 | Chin et al. | 345/501 |

OTHER PUBLICATIONS

Microsoft Press, 1997, Microsoft Press Computer Dictionary, Third edition, p. 347.*

Andrew S. Tanenbaum, 1984, Structured Computer Organization, Second edition, pp. 10-12.*

Pankhurst R J, "Program Overlay Techniques", Communications of the ACM, vol. 11, No. 2, Feb. 1968, pp. 119-125, XP002324829 USA.

Ancourt C et al, "Automatic Data Mapping of Signal Processing Applications", Proceedings of the IEEE International Conference on Application Specific Array Processors, IEEE Computer Society Press, Los Alamitos, CA, USA, Jul. 1997, pp. 350-362, XP002135742.

* cited by examiner

General flow

APPARATUS AND METHOD TO REDUCE MEMORY FOOTPRINTS IN PROCESSOR ARCHITECTURES

RELATED APPLICATIONS

This application claims priority of the following—U.S. provisional patent application having Ser. No. 60/269,378, entitled "Network Telephony Device," filed Feb. 16, 2001, which is hereby incorporated by reference in its entirety.

This application is related to the following—U.S. patent application having Ser. No. 10/032,667, entitled "Transferring Data Along With Code for Program Overlays," filed on the same date herewith, which is hereby incorporated by reference in its entirety.

FIELD OF THE INVENTION

The present invention provides an apparatus and method to reduce the memory footprint of a processor architecture by structuring processor code to be stored in an external device, and transferring into the processor certain code and associated data as it is needed. In particular, the present invention can be readily applied to a network telephone device or the like.

BACKGROUND OF THE INVENTION

Ethernet networks and the like for providing data communication among a plurality of computers are well-known. Such networks facilitate the transfer of data files, audio information and video information, as well as any other information which may be represented in binary form, among the plurality of computers.

Networks can be conveniently divided into two broad categories, based upon their size. A local area network (LAN) is a group of computers which are connected so as to facilitate the sharing of applications, data and peripherals. Local area networks are generally confined to a single building or a small group of buildings.

A wide area network (WAN) is made up of a plurality of LANs which are connected together so as to facilitate communication there between. A WAN may cover a city, a state, a country or even be international in scope. The Internet is an example of a WAN that includes more than 2,000 separate packet-switched networks that are located all over the world.

The popularity of networks, such as the Internet, has increased the desire for additional network services such as network telephony. The vast, high bandwidth network provides an ideal medium for audio communications. The nature of such telephone devices is to process voice signals that might come in over the network, typically as digital packets of information, or the like. To process such signals, various computing and processing devices are used, typically in the form of integrated circuit configurations.

Memory is a component that is used by computing devices to store data and/or code to be used in processing data. Integrated solid-state processing devices generally have an area of associated memory on the same chip substrate where the processing components are formed. Such memory is generally formed close to the processing components in order to enhance the overall speed and efficiency of the device. Memory, however, often takes up more room on an integrated device than processing components, with higher storage capacities generally requiring more space on the chip. Hence, by incorporating a sufficient amount memory on the same chip, the size of the chip layout is greatly increased. This is often not favorable, as larger chip layouts are more expensive to produce, take up more room in compact devices, and often draw more power.

One resource intensive form of processing to be performed by certain integrated computer devices includes digital signal processing (DSP). DSP generally refers to various techniques for improving the accuracy and reliability of digital communications. A description of the general theory behind DSP can be quite complex and is not included here, but is well known in the art. In particular, DSP is used to clarify, or standardize, the levels or states of a digital signal. A DSP circuit is able to differentiate between human-made signals, which are orderly, and noise, which is inherently chaotic. The number of MIPS (or millions of instructions per second) serves as a general measure of the computing performance of such a device. Accordingly, certain specialized DSP devices exist which are configured to perform signal processing in a more efficient manner than generalized processors. Signal processing communication devices often include a programmable DSP for processing varying levels of MIPS. A DSP processor is generally used for intensive real-time signal processing operations.

The code (or program) used by a processor can be written in a higher level language (i.e., C++), and then compiled down to a machine language (or assembly language) which is recognizable by the processor. Alternatively, a code developer can directly write assembly language, which is line-by-line usable by the processor. Writing and constructing code in a higher level language is usually much easier than directly writing assembly code, due to the structure afforded at the higher level. However, machine language that has been directly written, and not compiled from a higher level language, can be made to run much more efficiently on a processor. This is particularly true for processor intensive applications such as digital signal processing. Accordingly, the code (or program) associated with a DSP is generally not written or developed in a higher level language. Instead, the code is carefully tailored and hand-optimized in order to increase processing efficiency, and to reduce the amount of memory needed.

A dual processor configuration can also be employed, where a second associated general purpose microprocessor unit (i.e., an MCU, having its own memory, or external memory) is used for processing low-MIPS operations and protocol operations. As a result, fewer items need to be stored and/or processed on one processor versus another. The DSP, for instance, might have only certain hand-optimized code associated with the intensive real-time task of processing a signal. Accordingly, the associated memory for the DSP will be reduced.

Memory on a main processor can also be reduced by storing certain code or data in an external storage area (i.e., less expensive memory, second processor memory, or the like), and then pulling this code/data into the main processor, on an as needed basis. This configuration is generally referred to as a look-ahead caching scheme. Whereas look-ahead caching schemes are commonly implemented on general purpose (MIPS) processors, such caching schemes are not well suited for DSP operations. DSP operations often include complex mathematical calculations (i.e., multi-dimensional transformations, inversions, and the like) as performed upon vectors of data that represent real-time signals. Due to the specialized nature of such DSP code—and its reliance on certain data that is often stored externally—it becomes difficult to cache code and/or data for look-ahead reference. As a result, the traditional approach used to minimize the cost of DSP devices is to carefully hand-optimize all of the necessary DSP operations so that they comply with the available memory on the DSP device. This traditional approach often does not significantly reduce the memory required by the DSP, as hand-optimization techniques can only reduce the length of the code by a certain degree.

Instead, what is needed in the field is a system whereby a DSP can be configured to directly and efficiently access less costly memory, and/or memory associated with a secondary processor. The system would include an efficient transfer mechanism for moving code and/or data between secondary storage and the DSP for processing. The system would also provide for restructuring certain software associated with the DSP for modular transfer into the DSP memory. As a result, the DSP memory could be significantly reduced, and therefore a majority of the space required to form DSP device could be eliminated.

SUMMARY OF THE INVENTION

The present invention provides for an apparatus and method for reducing the memory footprint on a processor intensive device such as a DSP, or the like. A piece of software (or algorithm) can be broken down into at least one controlling piece and at least one working piece. The controlling piece of software is allocated for storage (or execution) on an external storage device. This external storage device would likely consist of memory, which is lower in cost than the memory associated with a processor intensive device. The working piece of software is stored and executed on the processor intensive device (i.e., DSP). The invention also consists of a transfer mechanism for providing fast and efficient access to the controlling piece by the working piece, and vice versa.

In particular, the present invention provides for reducing the memory footprint in a dual processor construct, wherein a high-MIPS processor (such as a DSP), is used in conjunction with a low-MIPS general purpose microprocessor unit (MCU). When the DSP and MCU are integrated within a single device, a hardware mechanism can be added to allow the DSP to directly and efficiently access the less costly MCU memory. The present invention consists of a system in which this transfer mechanism is integrated—along with a restructuring of the software—in order to significantly reduce the required DSP memory footprint (and thereby the cost of the device), without impairing the performance of the device.

Several example embodiments are provided herein, each of which differ in the amount of software changes required to achieve the particular reduction in DSP memory, and associated increase in performance. As an example, certain embodiments can provide a total DSP memory requirement of only 32,000 words (or less), as reduced from a memory requirement of 128,000 words—but with the same or similar functionality.

These various embodiments include, but are not limited, to the following:

(a) Dividing and distributing the DSP algorithm—as mentioned above, the signal processing algorithm can be split into a controlling piece, and a separate working (or signal processing) piece. A distributed signal processing framework is created that runs on both the MCU and the DSP. Certain aspects of the low-MIPS, high-memory footprint controlling piece are located on the MCU device (or associated memory). Still other aspects of the high-MIPS, lower-memory footprint working piece are located on the DSP device. These pieces are then seamlessly and efficiently linked together via the distributed framework using the hardware transfer mechanism.

(b) Splitting the signal processing piece into phases—the algorithms that process each block of data can usually be split into a sequence of similarly sized, independent blocks of operations. For example, vocoder algorithms often consist of a classification phase and one or more processing phases. Often, only one of the processing phases needs to be invoked for a particular block of data, based upon the results of the classification phase calculations. In such instances, the resources needed for any other processing phases are not necessary. Accordingly, the working piece of the algorithm is split into code segments, and the segments are organized into blocks of code and associated constant/data tables. The segments are stored in low cost memory and a manager device is used to copy (or transfer) the segment from the store into the appropriate DSP memory location using acceleration aspects provided by the transfer mechanism. The overall framework therefore manages the transfer of code and data segments.

Different frameworks might locate the various pieces on different devices, depending on the functionality desired, and the amount of memory reduction needed on the high-memory-cost DSP device. While the code/data would be faster to access, the largest DSP memory would result from locating all of the pieces on the DSP. While slow to access, the smallest DSP memory would result from locating all of the pieces on the MCU. As a compromise between either of these arrangements, all the controlling pieces might be located on the MCU, while all of the working pieces might be located on the DSP. This latter scenario might be further divided into three embodiments, including: no segmentation of the signal processing code/data; scheduling management (for transfer and such) of the segments from the DSP; and scheduling management of the segments from the MCU.

The latter scenario can provide for the lowest cost device, whereby the DSP only requires enough memory for a single data segment, and a single code segment, with a minimal overhead for the framework. The earlier variants also reduce the cost of the solution (by providing, in certain instances, for a smaller DSP memory), but also must accommodate less aggressive processing requirements. In the end, flexibility is an important aspect of the present invention, as any variation of the invention between these embodiments can be readily accommodated. Such flexibility allows users of the device additional options, including improvement of time-to-market, and/or reducing software performance risks, in the same device.

The present invention could be used in any device that would benefit from a DSP device having lower memory, and therefore lower size and cost. One such invention would be a telephony device, and in particular a network telephony device. An example network telephone might include a digital signal processor having a cache memory, an SDRAM, and a DMA arbiter (i.e., transfer mechanism) configured to exchange the code and data between the SDRAM and cache memory.

Accordingly, one aspect of the present invention provide for an apparatus for reducing the memory footprint of a first processor device, the apparatus comprising: a segment of program code which is split into portions including at least one controlling piece and at least one separate working piece; a storage area for storing certain pieces of the program code; a first memory area associated with the first processor device for receiving certain portions of the program code; and a hardware transfer mechanism for efficiently linking the storage area with the first memory area, wherein the memory footprint of the first processor device is reduced by locating certain controlling pieces of the program code in the storage area, and transferring only certain working pieces of the program code in the first memory area.

Still another aspect of the present invention provides for a method for reducing the memory footprint of a first processor device, the method comprising the steps of: splitting a segment of program code into portions including at least one controlling piece and at least one separate working piece; storing certain portions of the program code in a storage area; receiving certain portions of the program code in a first memory area associated with the first processor device; and linking the storage area with the first memory area using an efficient hardware transfer mechanism, wherein the memory footprint of the first processor device is reduced by locating certain controlling pieces of the program code in the storage area, and only certain working pieces of the program code in the first memory area.

Still another aspect of the present invention provides for a distributed signal processing framework for reducing the memory footprint of a digital signal processing device, the framework comprising: at least one signal processing algorithm, the algorithm being split into a controlling piece and at least one separate processing piece; a low-MIPS processor device having a high-memory footprint, whereby the controlling piece is stored and runs on the low-MIPS processor device; a high-MIPS processor having a low-memory footprint, whereby at least one of the separate processing pieces is stored and runs on the high-MIPS processor device; and a hardware transfer mechanism for efficiently linking the pieces through the distributed framework.

Still another aspect of the present invention provides for a network telephone device, comprising: a digital signal processing having a cache memory; an SDRAM; and a DMA arbiter configured to exchange code and data between the SDRAM and the cache memory.

It is understood that other embodiments of the present invention will become readily apparent to those skilled in the art from the following detailed description, wherein shown and described are only example embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Certain aspects and advantages of the present invention will be apparent upon reference to the accompanying description when taken in conjunction with the following drawings, which are exemplary, wherein.

DESCRIPTION OF THE PREFERRED EMBODIMENTS

The present invention is described below in terms of certain preferred embodiments, and representative applications. The example apparatus and processing methods are intended to be used with any communication system that would benefit from having a reduced memory footprint, particularly in a processor intensive device such as a DSP. A reduction in memory on any type of device facilitates reduction of the overall size, cost, and complexity of the device, wherein DSPs are generally associated with more costly memory. Information and data might be stored and accessed from many types of external storage devices. Moreover, the information and data might be stored and processed in an associated processor having lower cost memory. The logical partitioning of the code into controlling pieces, working pieces, and data pieces, can also be advantageously applied to many other hardware architectures and structures.

Figure 1:
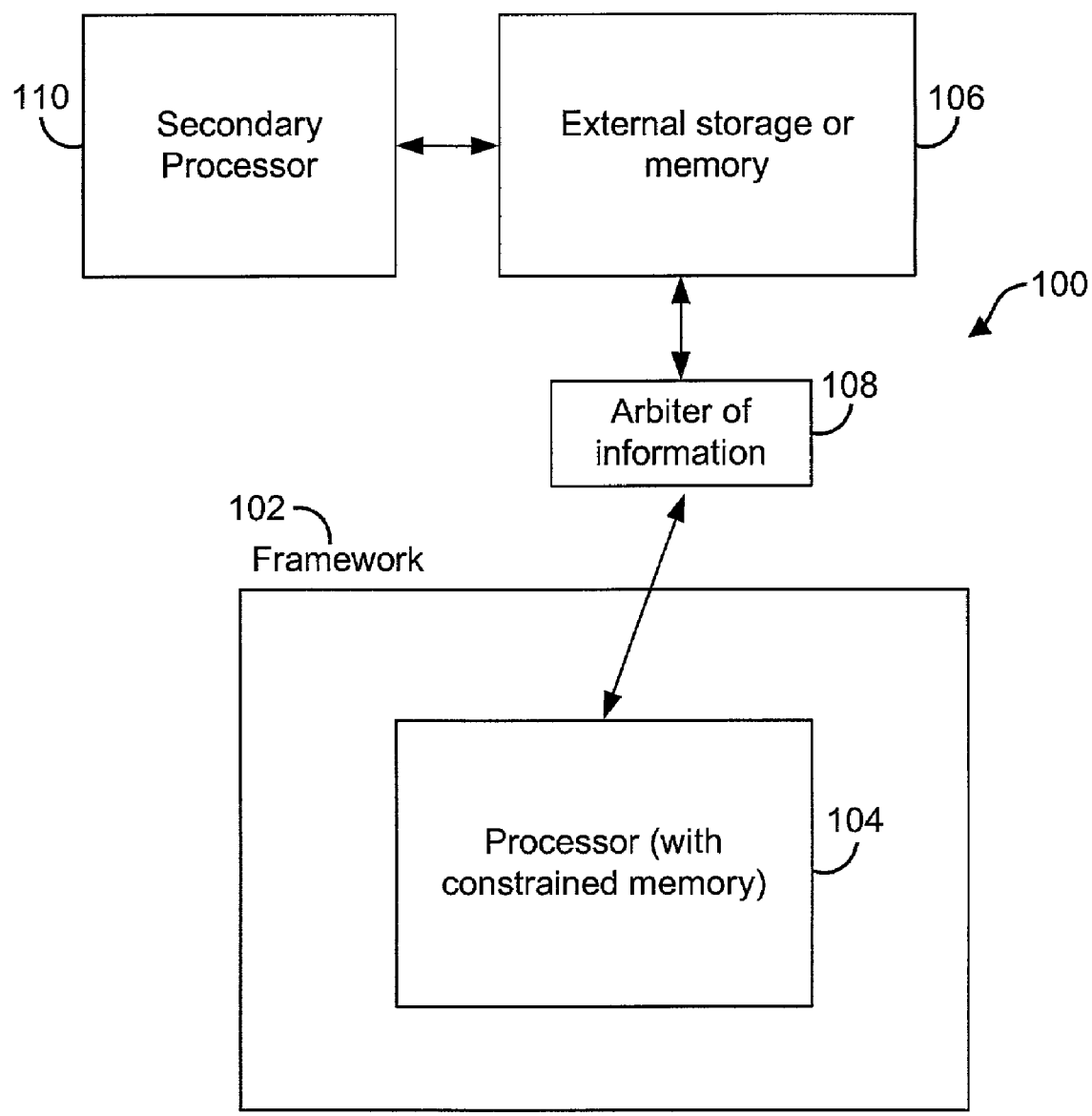
FIG. 1 is representative block diagram, according to at least one aspect of the present invention, of a processor with constrained memory interacting with external storage and/or a secondary processor to supply the requisite code/data.

Referring to FIG. 1, a generalized block diagram 100 is shown of a framework 102 which includes a processor having constrained memory 104. This processor might include a DSP or the like, with the amount of memory being constrained (among other things) by the overall cost of including more memory on a typical DSP (or other processor-intensive) device. By forming the processor 104 with less memory, the footprint of the overall DSP device will be greatly reduced. Since memory often makes up a majority of the area occupied by such an integrated chip, any reduction in memory serves to greatly reduce the overall size and cost of the device.

The processor 104, however, might still need to access various data or program information, beyond that stored in the constrained memory area. Accordingly, an external storage or memory device 106 is shown. Efficient access to this externally stored information is provided by the block labeled Arbiter of Information 108. This arbiter 108 serves as a transfer mechanism to quickly and efficiently move code and/or data from the storage or memory device 108 to the processor 104 where (and when) it is needed. As further detailed below, the external storage or memory device 106 might also be associated with (or a part of) a secondary processor 110. Note also that while the processor 104 might be any type of device having constrained memory, the following examples will be generally described in terms of a DSP for the processing of signal data and related signal processing algorithms. The secondary processor 110 will generally be described in terms of a microcontroller unit (MCU), which is meant to include general processor units, these units typically having lower cost memory associated with them.

The formation of the software portion of the present invention derives from two key observations. The first observation is that voice or voice-band data signal processing algorithms can be generally divided into a control part (or "controlling piece") and a signal processing part (or "working piece"). The control part is primarily made up of scalar code. The control part might include protocols for the control of the overall system hardware, control of the DSP, and/or configuration of the hosting entity. The control part might also include aspects of a caching scheme for moving parts of the code and/or data around in memory. This scalar code can often be large in size, but is relatively small in processing demand. The signal processing part is generally smaller in code size, but has a much larger processing (MIPS) demand.

Figure 2:
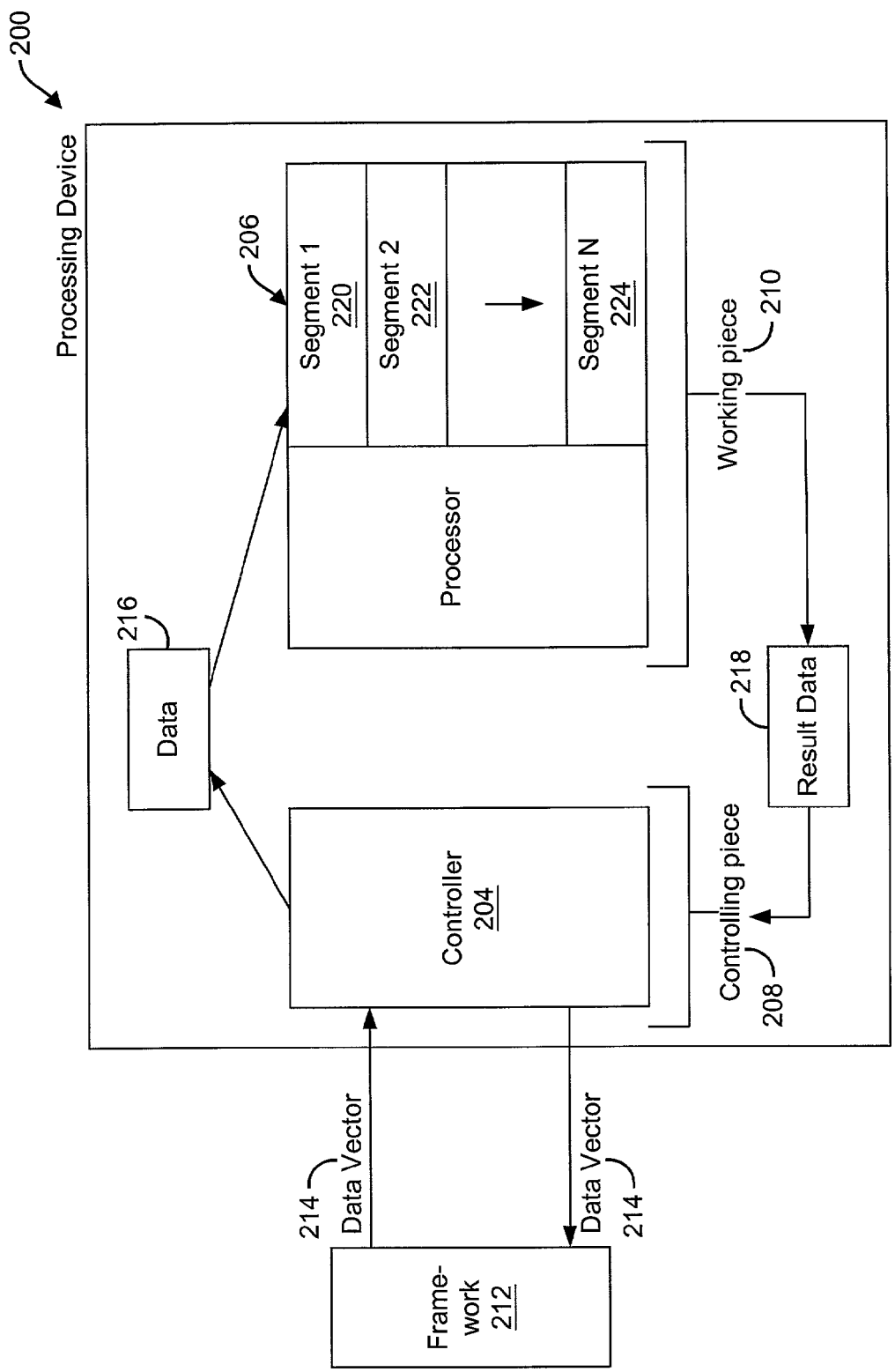
FIG. 2 is a representative block diagram, according to at least one aspect of the present invention, of the software or algorithm being broken down into a controlling piece and working piece, the working piece being further segmented into phases.

This aspect of the invention can be referred to as a distributed framework, which is leveraged first by splitting the algorithm into the controlling piece and the separate working piece (as detailed above). Referring now to FIG. 2, a representative block diagram 200 is shown, which utilizes only a single processing device. The processing device 202 is shown to include an algorithm having controller parts 204 and signal processing parts 206. Accordingly, the algorithm has been split into a controlling piece 208 and a working piece 210. A framework 212 is associated with the device and supplies a data vector 214 (or the like) to the controller 204. The data vector would include an array of samples. The controller 204 processes the data vector 214, and then takes and passes certain data 216 extracted from the data vector 214 onto the processor 206 which then returns resultant data 218 to the controller which in turn conveys the result back 218 to the framework 214'. Physically, blocks 218 and 214' may be the same data space (making the transfer a single operation) or separate data spaces. Similarly, 218 may share the same physical space as 216.

The second observation is that the signal-processing part can typically be split into phases. For each block of data processed by an algorithm—and in particular, for digital signal processing operations—there is usually a classification phase and one or more processing phases. The classification phase first determines what kind of data is being processed. The classification phase is thereafter used to determine which subsequent phases might need to be used to complete the processing of the incoming data. Sometimes it is determined that only one of the processing phases needs to be invoked for a particular block of data, based upon the results of certain classification phase calculations. According to this simple example, a variety of code (and associated data) that might be used in association with the other processing phases are therefore not necessary. Accordingly, memory on the processing device can be saved by not loading the code or associated data for these unused phases.

This aspect of the invention leverages the principles behind the second observation by splitting the working piece of the algorithm into code segments. These segments are organized into blocks of code, along with the constants and data tables associated with each section of code. Referring again to FIG. 2, the working piece 210 is shown with certain parts of the signal processing code divided into a first segment 220, a second segment 222, and so forth through an Nth segment 224.

Figure 3A:
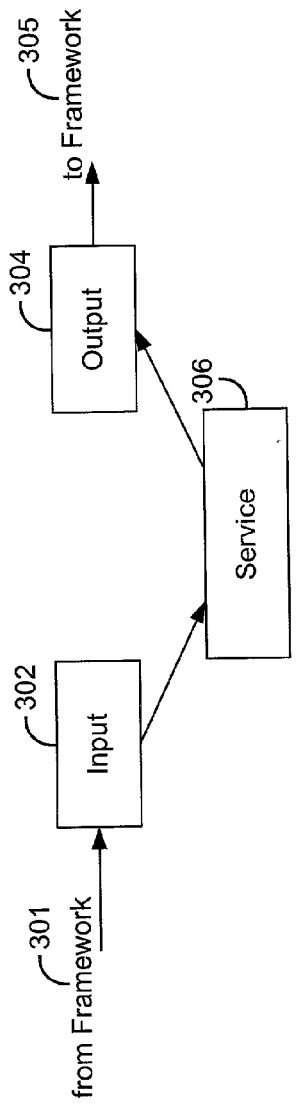
FIG. 3A is a prior art block diagram of a service taking an input data vector and returning an output data vector.

In terms of an example relating to digital signal processing, FIG. 3A shows a prior art example of an input buffer 302 receiving data from a framework 301 (as a data vector, or the like). The data is passed to a generalized service 306. The service might include code relating to a certain communication standard for voice, fax, or data (i.e., G.72x, or the like), wherein certain functions are called that exist within the code of the service. These function or processor calls then output information to an output buffer 304, which sends the data back to the framework, in the particular form 305 that is required for such output data. The service functions generally input data into a pointer or parameter associated with the function call, and then return the output data in another pointer or parameter. Accordingly, the entire block of communication standard code (or the like) is traditionally stored in a sufficient amount of memory on a processor, for ready access to the various functionality within the standard.

Figure 3B:
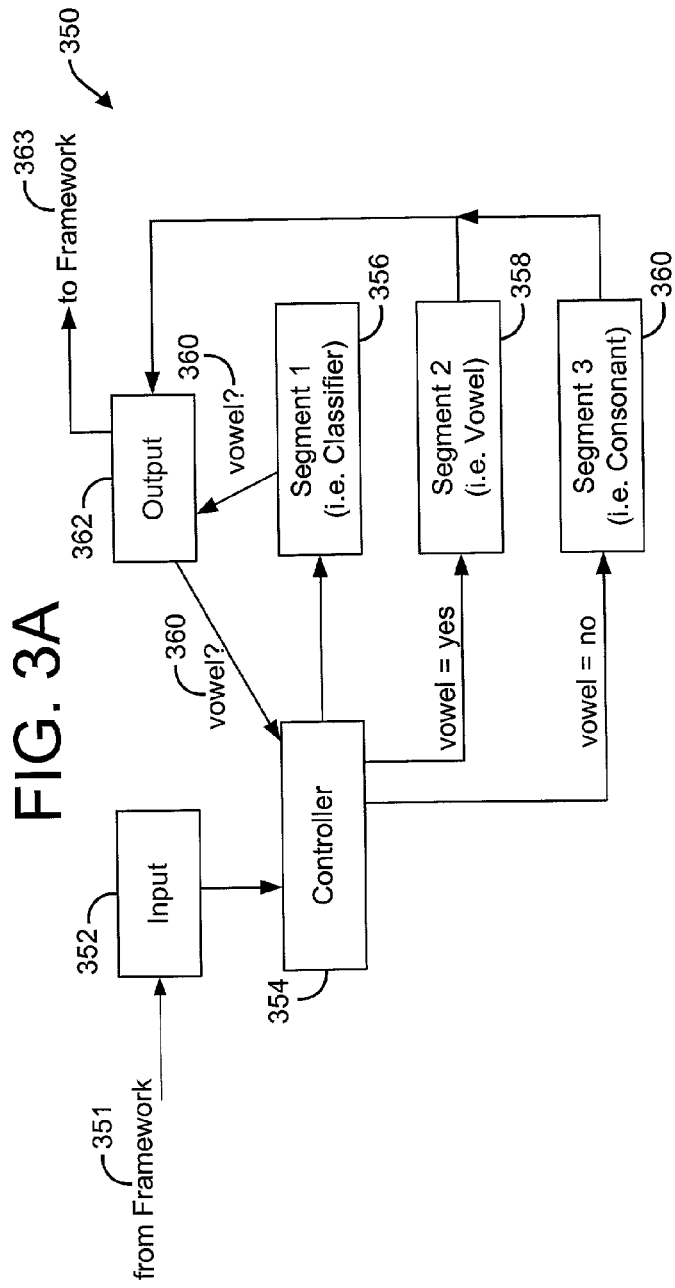
FIG. 3B is a representative block diagram, according to at least one aspect of the present invention, of the software (or algorithm) being broken down and utilized as segments.

In the present invention, the controller will decide which segments of code to pull forward for processing, based upon the current state of the data. FIG. 3B shows a representative example 350 using principles of digital signal processing. An input buffer 352 is shown receiving a data vector 351 (or the like) from the framework. The data vector 351 is passed to the controller 354. The signal processing code has been broken up into three example segments, including a classifier segment 356, a segment for processing vowels 358, and a segment for processing consonants 360. The signal might, for instance, be first processed to detect peak amplitudes, or average power. Based upon such initial information, certain signal processors thereafter attempt to analyze human speech and determine if the sounds contained within the signal are vowels or consonants. Accordingly, the controller 354 first sends the input data to the first segment 356, or classifier. The classifier then returns an indication 360 (i.e., flag or the like) of whether the signal information is a vowel (or not a vowel) to the output buffer 362. This information 360 is next used by the controller 354 to determine the next segment of code to be used in processing the signal data. Segment 2 (358) is used if the classifier indicates that the signal information is a vowel. Segment 3 (360) is used if the classifier indicates that the signal information is not a vowel. Thereafter, the result of the processing performed by either segment 2 (358) or segment 3 (360) are passed to the output buffer 362, and then used in an appropriate format 363 by the framework.

Next a distributed signal processing system is described that runs on both a first processing device and at least a second processing device. The first processing device would include a DSP (or similar memory-constrained device), and the second processing device would include a MCU (or similar processor with lower-cost memory). As shown in FIG. 200, all of the processing elements might be included on one device. However, the preferred method of distributing the processing includes locating the low-MIPS, high-memory footprint part of the algorithm (i.e., the controlling piece) on the MCU device block. The high-MIPS, lower-memory footprint part of the algorithm (i.e., the working piece) remains located on the DSP block.

Figure 4:
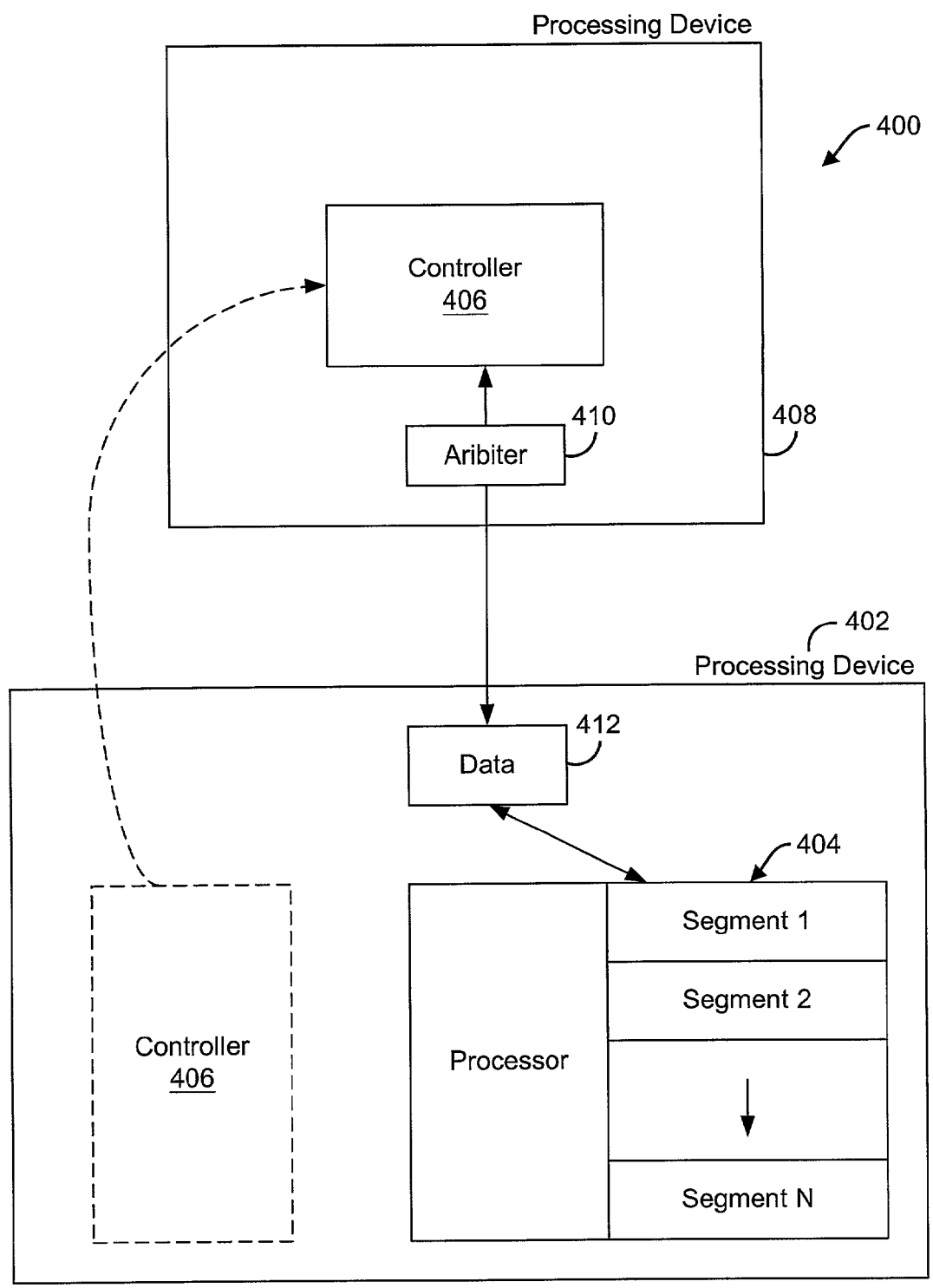
FIG. 4 is a representative block diagram, according to at least one aspect of the present invention, of certain segments of the software being located on different processors.

Referring now to FIG. 4, a block diagram 400 is shown that demonstrates certain aspects of the distributed signal processing system. The first processing device 402 is shown to contain the signal processing part 404 (or working piece) of the algorithm, which has been further segmented into phases. Device 402 is also shown to have once contained the controller 406 (shown as dotted-line element), but this controller part 406 has now been moved to the second processing device 408.

For this system to work properly, the pieces are then linked, seamlessly and efficiently, via the distributed framework using the hardware transfer mechanism, or arbiter of information 410. The arbiter 410 might be configured to run on either processing device 402 or 408. In this example, the arbiter 410 is shown to be stored and processed on the MCU-type device 408, which serves to further lessen the memory requirements and processing load on the high-MIPS processing device 402. The arbiter 410 could also be located on the first processing device 402. The arbiter 410 serves to transfer data 412 (which might include code and/or data) between the controller 406 and the signal processing part 404.

Figure 5:
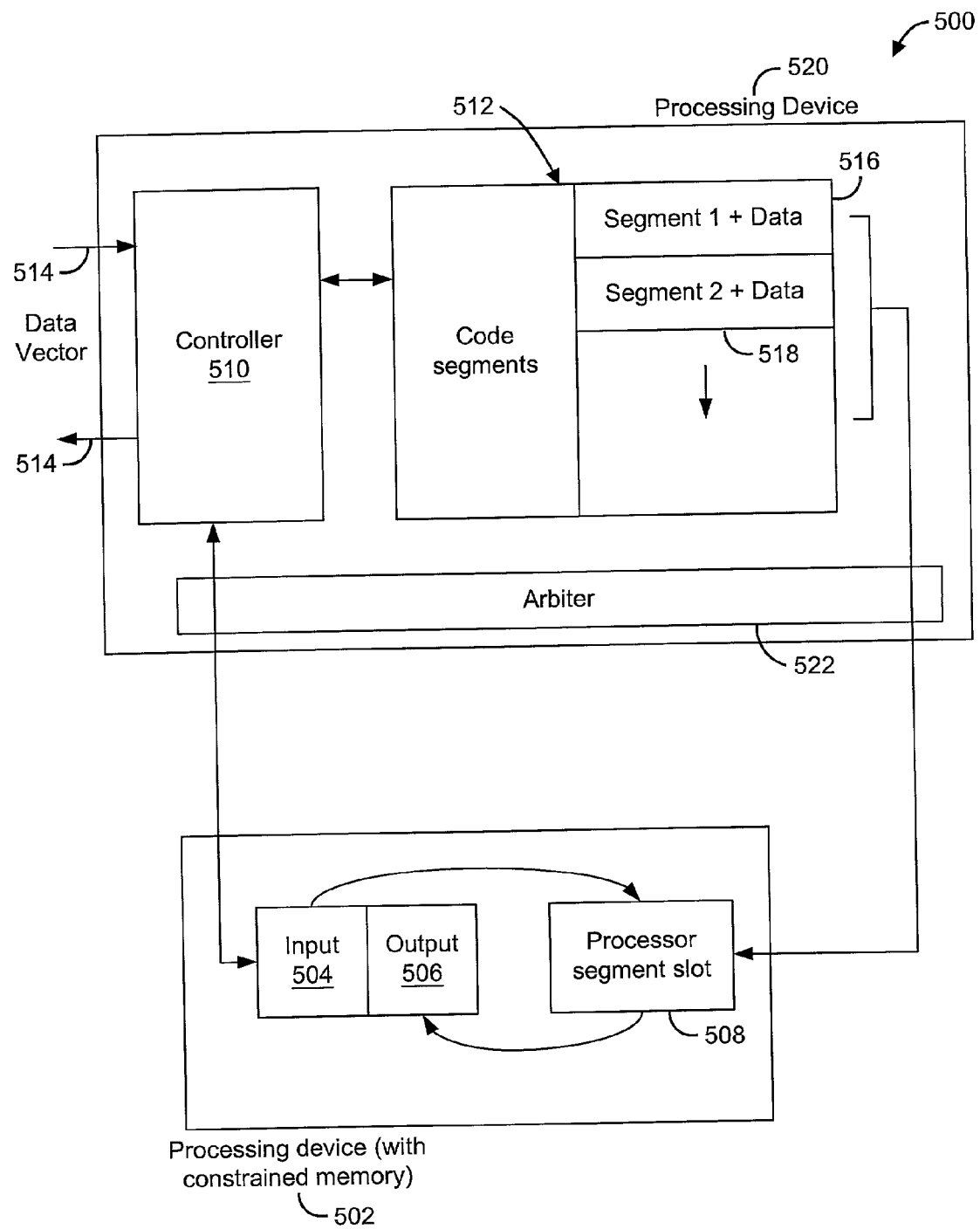
FIG. 5 is a representative block diagram, according to at least one aspect of the present invention, of a substantial amount of segments of the software being located on a low-MIPS processor with cheaper memory, and segments of the code being transferred down as needed into a segment slot on a high-MIP processor with constrained memory.

FIG. 5 next shows a representative embodiment 500 that provides the most relative savings with regards to the amount of memory that might be required on the first processing device. The first processor (having constrained memory) 502 is shown having an input buffer 504 and an output buffer 506. In this example, however, only a relatively small segment of memory—referred to as a processor segment slot 508—has been provided in association with the first processor 502. The majority of the code and information have been moved up to the second processing device 520, which is configured to have relatively cheaper memory. The controller (or controlling piece) 510 is shown receiving a data vector 514 from the framework (not shown). The controller 510 then processes and determines what part of the data vector to transfer down to the input buffer 504. The signal processing part (or working piece) 512 is shown to consist of a variety of code segments 516, 518, and so forth, along with associated data for each segment. A store is created in the low cost memory of the processing device 520 for the segments. The controller 510 also determines what particular code segment will be needed in order to process the information in the input buffer. An arbiter (or segment manager) is used to copy the segment from the store to the data memory of the first processing device using hardware acceleration. According to direction provided by the controller, the arbiter 522 will transfer the appropriate segment code and data into the processor segment slot 508. The code in the segment slot 508 will process the data from the input buffer 504, and produce a result which is stored in the output buffer 506. The result is thereafter communicated back up to the controller 510. Depending upon the result contained in buffer 506, the controller 510 may transfer another code segment 516, 518 and so forth, to processor segment slot 508. In this manner one or more program segments can be applied against the original input data vector. Once the results indicated in segment slot 508 indicate completion of the algorithm, the controller will then communicate the results back to the framework as a data vector 514'.

Figure 6:
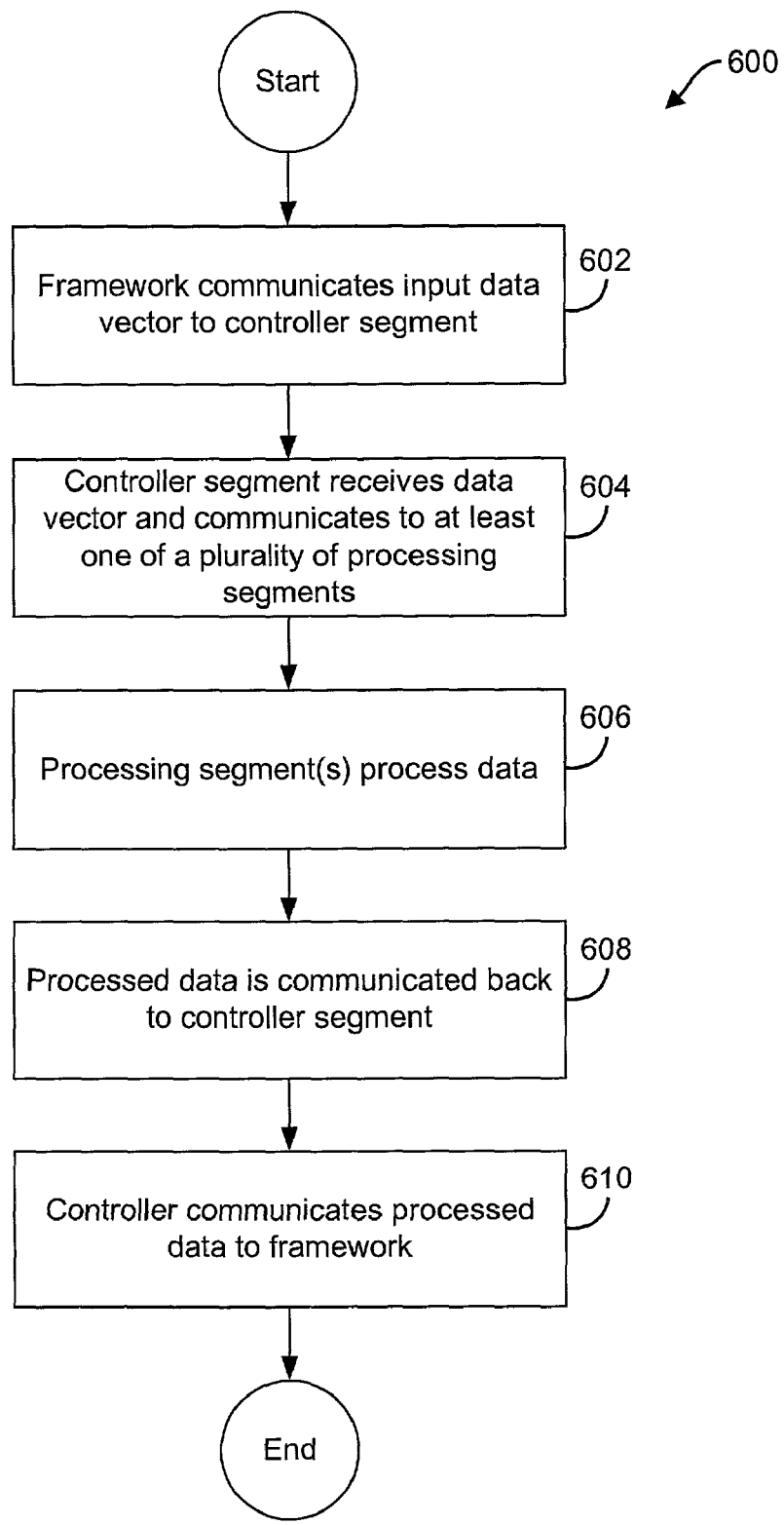
FIG. 6 shows a series of representative steps, according to at least one aspect of the present invention, for utilizing the segmented code.

A representative series of steps 600, showing the flow of processing for the above described hardware, is shown in FIG. 6. In step 602, the framework communicates an input data vector to a controller segment. In step 604, the controller segment receives the data vector and communicates related information to at least one of a plurality of processing segments. In step 606, the processing segments involved (according to the controller) process the data. In step 608, the resulting processed data is communicated back to the controller segment. Step 610 then shows the controller communicating the processed data back to the framework.

Figure 7:
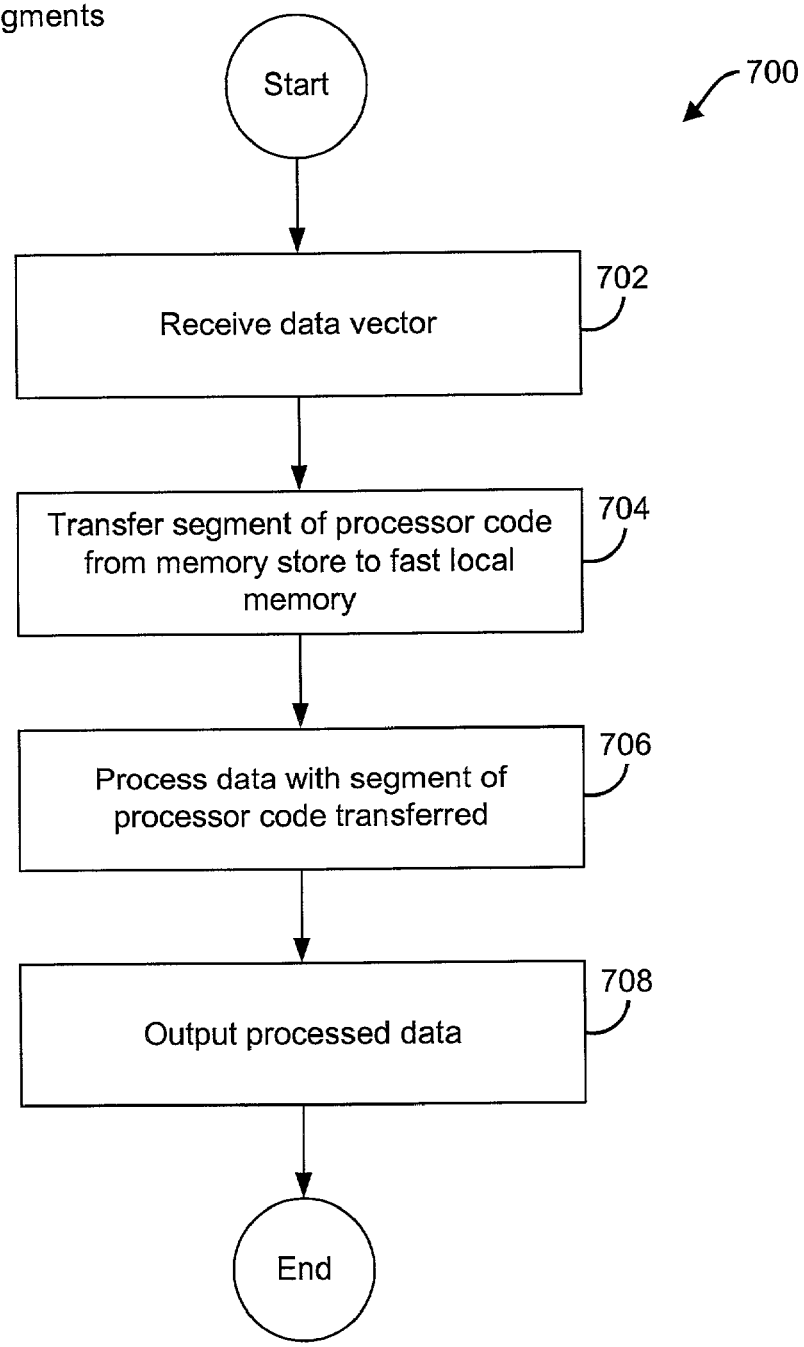
FIG. 7 shows a series of representative steps, according to at least one aspect of the present invention, for transferring and utilizing the segmented code.

The steps involved in FIG. 6 could be applied to any framework where the processing code has been segmented, regardless of where those segments are stored in memory and/or processed. Note that the segments might be a single processing block of code, or one of many blocks that might be used. However, latter embodiments show the processing code being split between a lower cost memory store and a faster memory. The memory store might include a slow external DRAM, which is managed by the MCU, or alternatively by the DSP. Fast memory might include a cache (or the like) associated with the DSP. Accordingly, FIG. 7 shows certain representative steps 700, as considered from the perspective of the DSP. In step 702, a data vector is received (from the framework). In step 704, a segment of the processor code is transferred from the memory store to fast local memory (i.e., local to the DSP). In step 706, the received data is processed with the segment of processor code that was transferred. If the results of step 706 are incomplete, steps 704 and steps 706 are repeated using different code segments until the algorithm has completely executed the appropriate code for the data vector 702. In step 708, the processed data is output, and sent back to the framework.

Figure 8A:
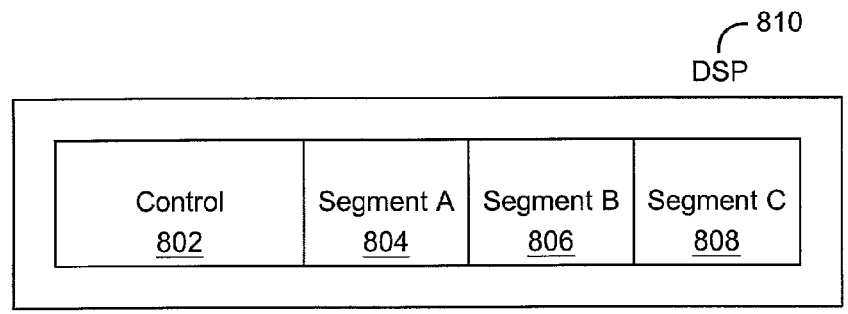
FIGS. 8A, 8B, and 8C are block diagrams, according to at least one aspect of the present invention, showing the location of code segments on different processing devices.
Figure 8B:
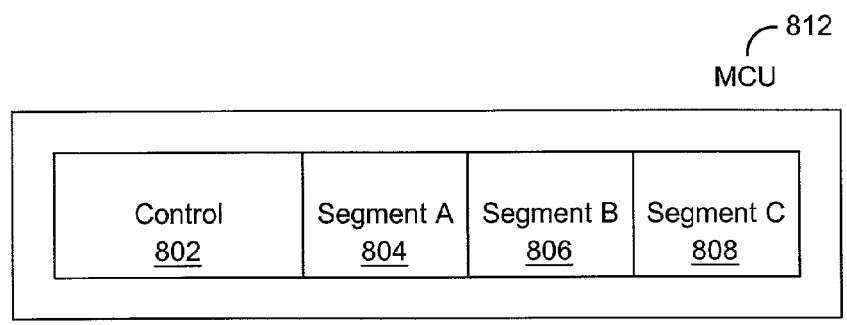
Figure 8C:
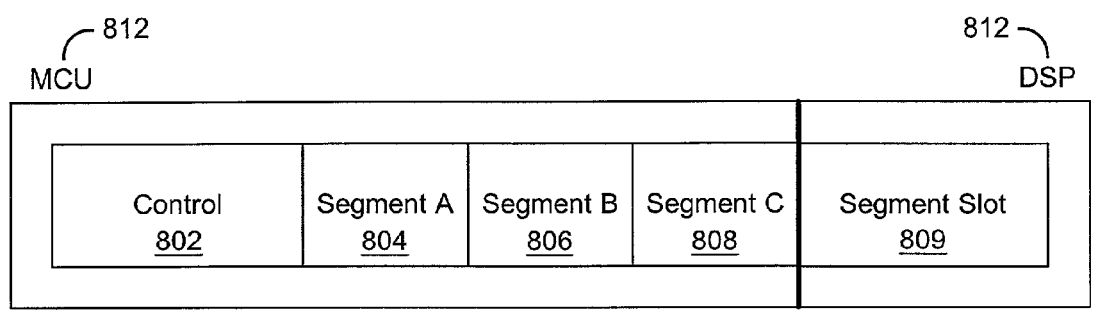

FIGS. 8A–8C serve to further demonstrate how an algorithm or set of code can be divided between the processors. If FIG. 8A, the algorithm is shown divided into a control segment 802, and subsequent signal processing segments 804, 806, and 808. In this first instance, all of the segments are located on a representative first processor, or DSP 810. In FIG. 8B, a similar division of the algorithm is shown, but with all of the segments located on a representative MCU 812. In FIG. 8C, the code segments are divided between the processors. The control segment 802 and segment A (804), segment B (806) and segment C (808) are shown located on the MCU 812. Each of these segments are temporarily relocated to the Segment Slot 809 on the DSP 810, one at a time, and in real-time.

The code divisions shown are only meant to be exemplary, and the code segments could be divided between the processors in a variety of other configurations. However, when all of the pieces are located on the MCU, and during run-time all of the pieces are temporarily relocated to the DSP, this does provide for the lowest cost device, which requires only enough DSP memory for a single data segment and a single code segment (i.e., sized according to the largest of all the code segments in the memory store), along with a minimal amount of extra overhead for the framework.

Figure 9A:
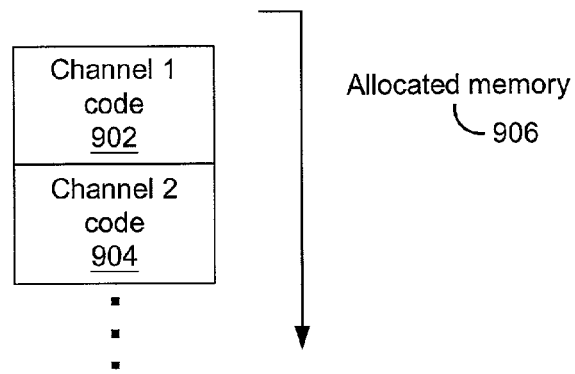
FIG. 9A is a prior art representation of the code for various channels being placed in allocated memory.
Figure 9B:
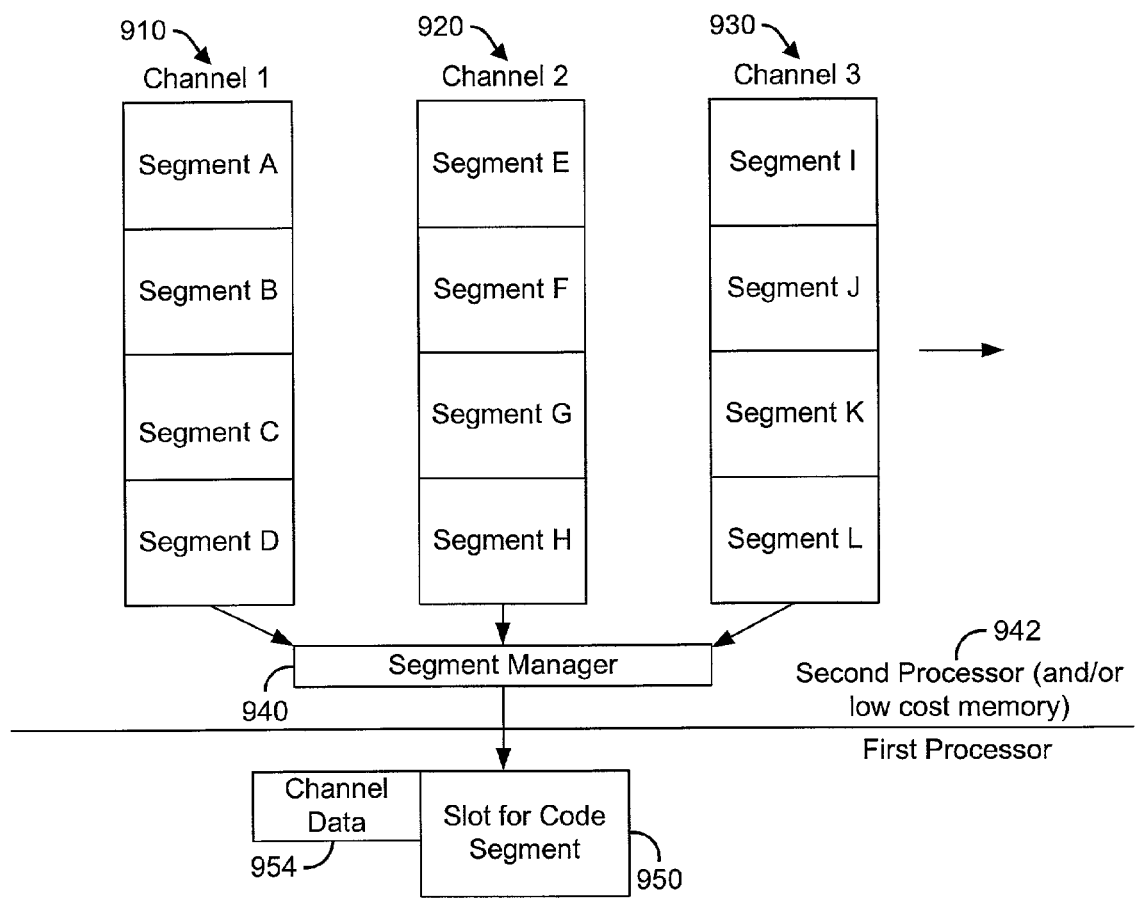
FIG. 9B is a block diagram, according to at least one aspect of the present invention, showing the segmentation of three channels on a second processor, with the segments being transferred to a slot for the segment of code and processed on a first processor.

Under the present system, the number of channels for the system can also be readily increased without increasing the amount of memory required on the DSP. Note that prior configurations required more and more data and program memory as new channels were added particularly if different algorithms are running on different channels. FIG. 9A shows a prior art embodiment of this case where the addition of more channels (i.e., voice, modem, Fax capabilities, or the like), is facilitated by including the channel 1 code 902, the channel 2 code 904, and so forth into the allocated memory store 906. The amount of memory is often limited on DSP devices, and therefore certain extra channel capabilities might not be added. Moreover if they are added, the amount of memory associated with the DSP device might need to increase, rather than decrease, thereby adding cost and complexity to the DSP device.

The present invention instead segments the code into particular phases (and associated data) for each of the channels. This code is again stored in lower cost memory, and certain parts of the code might be processed in a second (lower-MIPS) processor device 942. Channel 1 code 910 is broken up into representative segments A, B, C, and D. Channel 2 code 920 is broken up into representative segments E, F, G, and H. Channel 3 code 930 is broken up into representative segments I, J, K, and L. Each of these segments might represent a controlling piece code, or a working piece code. The working piece code might include classification code, vowel processing code, and/or consonant processing code (as discussed above). A segment manager 940 is used to determine which segment should be transferred down to a slot 950 for receiving the code segment. In this example, the slot 950 is located on the first processor, or DSP type device 952. A slot 954 might also be used to convey the input and output channel data associated with the incoming segment. Slot 954 may be conveyed each time a new code segment is copied into slot 950, or slot 954 may be conveyed once for each series of code segments copied into slot 950 for operation on the channel data. Accordingly, the multiple channel configuration does not need to use more memory on the DSP device. Instead, each of the code segments (and associated data) are moved into position when needed via the segment manager 940.

Figure 10:
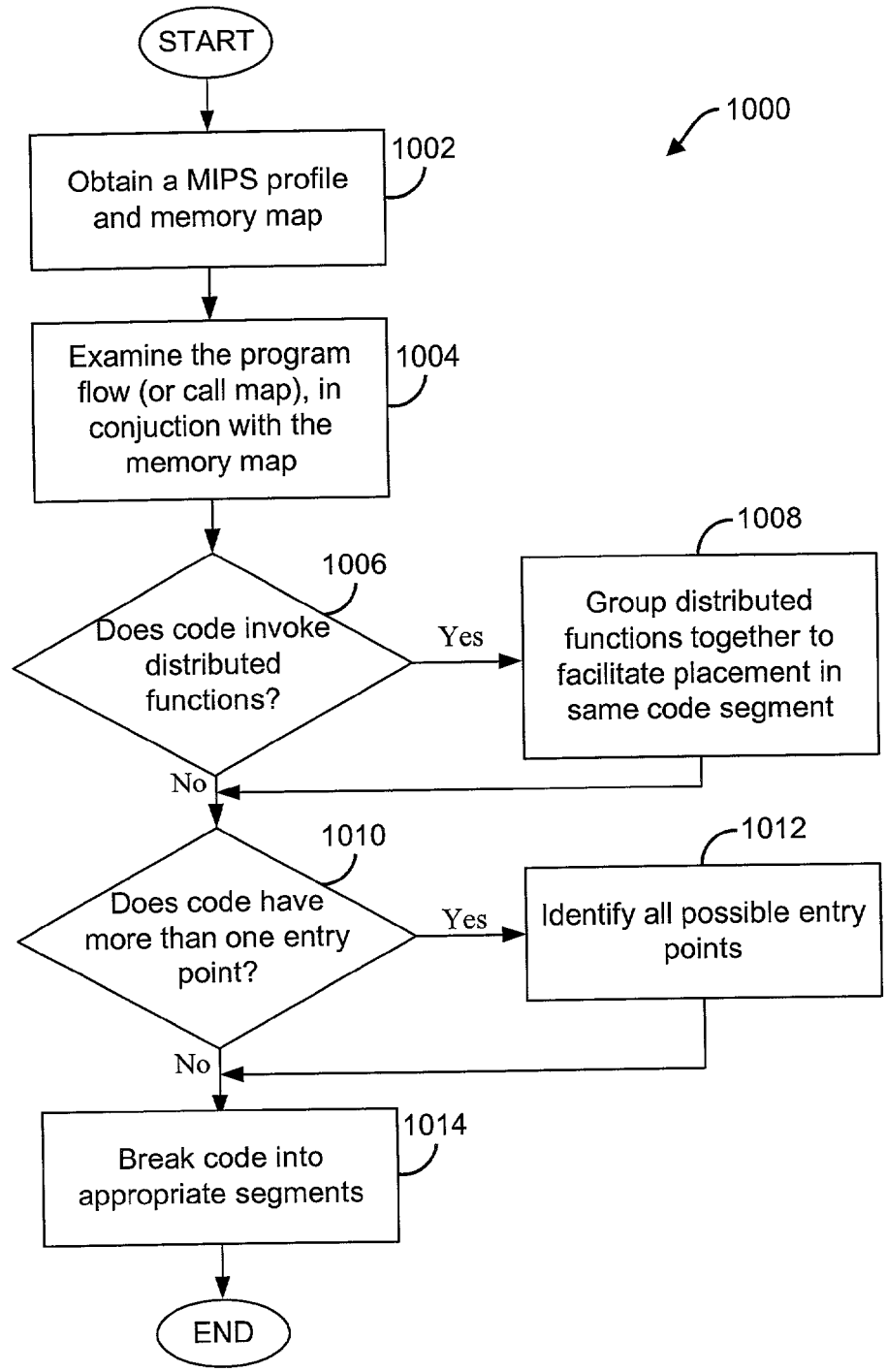
FIG. 10 shows a series of representative steps, according to at least one aspect of the present invention, for breaking the code into the various segments.

Algorithm (or code) segmentation—segmentation of the algorithm or code is an iterative procedure. With each iteration, the segmentation is refined until a particular memory and/or MIPS target is reached. FIG. 10 shows certain representative steps 1000 associated with segmentation. Before iteration begins, a MIPS profile and/or memory map are obtained, as shown in step 1002. One aspect is to perform segmentation such that all the segments consume the same amount of MIPS and/or take up the same amount of program space, and table memory instance. Most situations require a tradeoff between these goals. For a network telephony device (i.e., IP phone—see details below), the amount of DSP memory is generally constrained. Accordingly, the segmentation is biased towards equal sized code segments that will fit within this constrained memory.

For each iteration, the program flow (or call map) is examined. Additional reference is made to the memory map, which gives the code size of each function. Such examination is shown in step 1004. The code is then broken up into segments of approximately equal size, while taking special care not to break processing loops. Breaking such loops is undesirable, as it would necessitate that certain segments be reloaded during the same processing cycle (or frame). Instead, it is much more efficient to load the code associated with the entire loop one time and then let it run until finished.

Additionally, the iterative process will try and not break up functions, if this is possible. Breaking up functions requires turning some of the local variables for the function into instance memory and hence increase the overall memory footprint.

Certain code, however, invokes functions that are distributed in a sporadic fashion in different files relative to the program flow. Conditional block 1006 inquires whether the code invokes such distributed functions. If yes, then step 1008 shows the need to group the functions in such a way that will tie them together in terms of program flow, so as to allow them to be placed in the same code segment.

The code might also have more than one entry point, as shown by the inquiry in conditional block 1010. If more than entry point exists for the code, then block 1012 shows the step of identifying all possible entry points into that particular block (i.e., the block including a segment or multiple segments) of code. Identification of these entry points allows tools associated with segmentation to identify all of the functions that might exist on a page, and thereafter load the appropriate page for any of the possible function calls (or entry points). Thereafter, step 1014 shows the code being broken into appropriate segments according to the principles defined above.

Network telephony device—a network telephone device will next be described, as an example of the type of device that might use the aforementioned principles, and with specific examples of application thereof. Although embodiments of the present invention are described below and illustrated in the drawings as being configured for use in an Ethernet network, those skilled in the art will appreciate that the network telephone of the present invention is likewise suitable for use in various other network environments. Thus, description and illustration of the network telephone in an Ethernet network is by way of example only and not by way of limitation.

Figure 11:
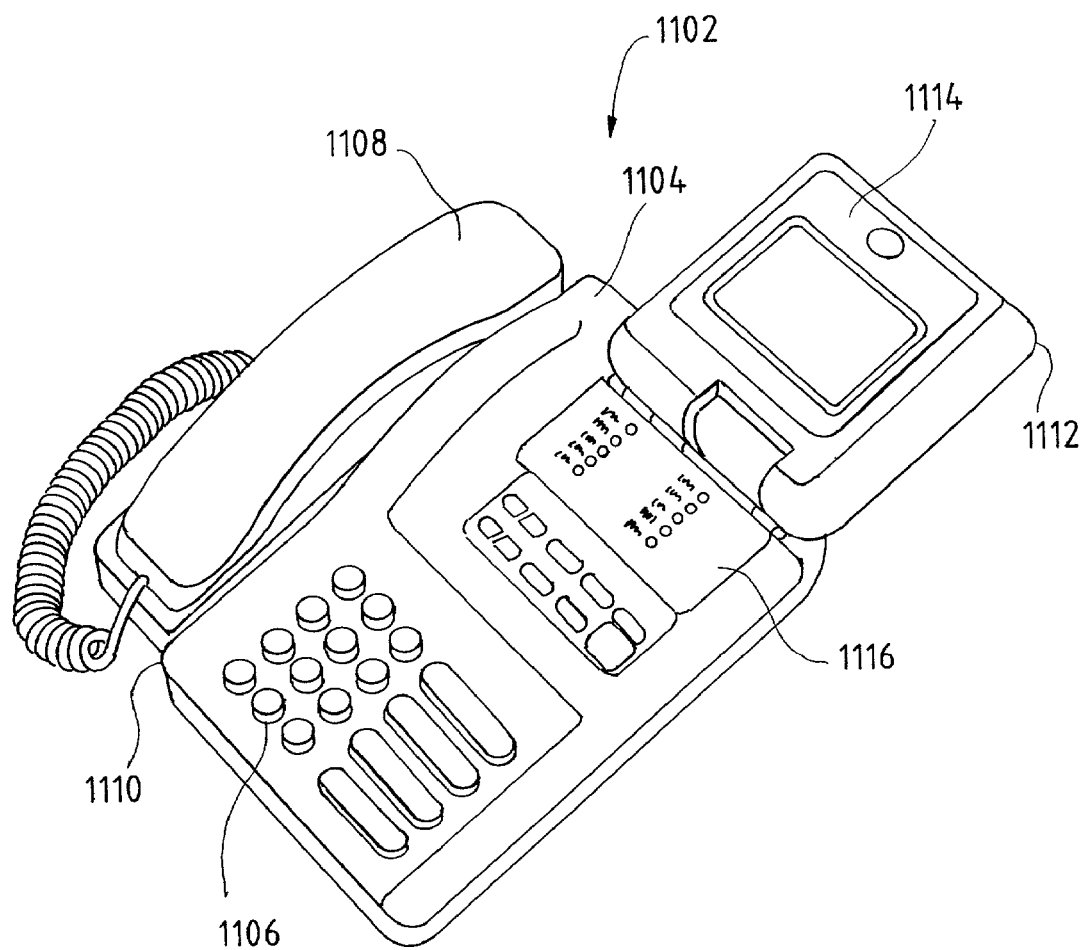
FIG. 11 is a perspective view of an network telephone in accordance with an exemplary embodiment.

FIG. 11 shows an exemplary network telephone. The network telephone 1102 can be constructed in a variety of fashions including, by way of example, a high density light weight construction for home and portable applications. The network telephone 1102 is shown with an exterior housing 1104 formed of a suitably sturdy material and includes a dialing device such as a keypad 1106. However, those skilled in the art will appreciate that various other types of dialing devices, e.g., touchpads, voice control, etc., are likewise suitable. A headset 1108 is positioned over an internal speaker 1110. The internal speaker 1110 is optionally part of the network telephone. An LCD housing 1112 is hinged to the top of the network telephone 1102. The LCD housing 1112 may be may be opened to expose an LCD display 1114 and special function keys 1116.

The keypad 1106 is used to enter user inputs such as telephone numbers and passwords. The special function keys 1116 can be used for a variety of purposes including, by way of example, to enter control command inputs, establish communications and to select different modes of operation. The LCD display 1114 can provide the user with various forms of information including the dialed number, as well as any other desired information such as network status, caller identification, etc.

Figure 12:
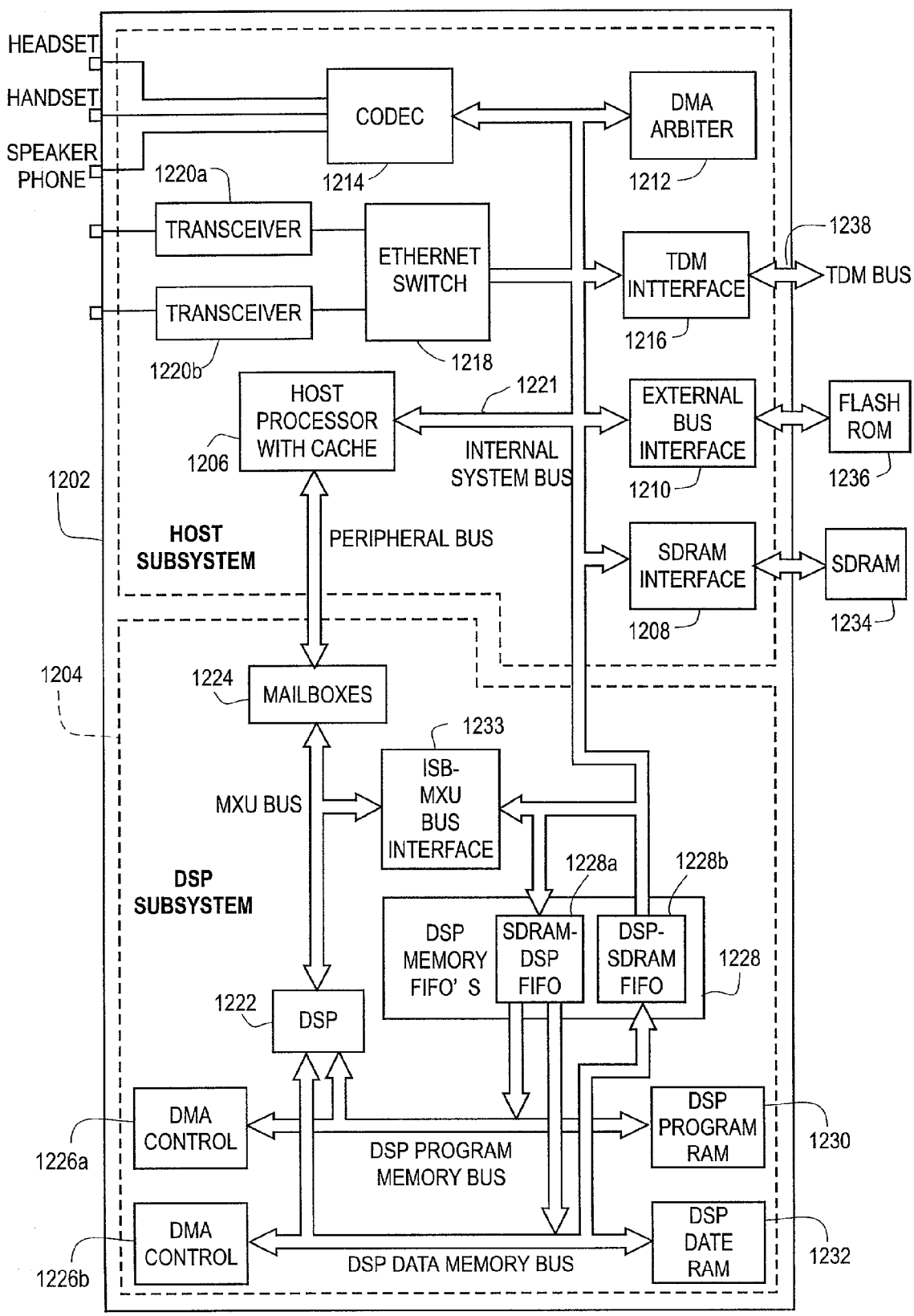
FIG. 12 is a functional block diagram of the network telephone in accordance with an exemplary embodiment.

FIG. 12 is an exemplary functional block diagram of the network telephone. The described exemplary embodiment utilizes a direct memory caching technique to optimize the use of internal digital signal processing (DSP) memory to reduce the silicon die area. This optimization may be achieved by partitioning vocoder memory into overlay pages and storing them in external SDRAM until required by the DSP. This approach allows for the integration of the network telephone architecture onto a single integrated circuit (IC)

for a low cost, low power, reliable and more compact solution. As those skilled in the art will appreciate the described exemplary embodiments of the network telephone architecture do not require integration into a single IC and may be implemented in a variety of ways including discrete hardware components.

The network telephone can be implemented with a DSP co-processor architecture. Services requiring large instruction sets can be broken down into small code segments and stored in external SDRAM. When the code segments are scheduled to be executed, the DSP can initiate a DMA transfer of the code segments and associated data from the SDRAM to internal DSP memory.

Referring now to FIG. 12, the overall system can be divided into a host subsystem 1202 and a DSP subsystem 1204. The host subsystem 1204 includes a host processor with cache 1206, a SDRAM interface 1208, an external bus interface (EBI) 1210, a number of DMA arbiters 1212, a codec 1214, a time division multiple (TDM) interface 1216, an Ethernet switch 1218, and two Ethernet transceivers 1220a, 1220b. All these components can be connected via a 32-bit internal system bus (ISB) 1221 which runs at a suitable frequency, by way of example 100 MHz. The DSP subsystem 1204 includes a DSP 1222, mailboxes 1224, two DMA controllers 1226a, 1226b, DSP memory 1228, DSP program RAM 1230, DSP data RAM 1232, and an ISB-MXU bus interface 1233.

The Host Subsystem—The host processor 206 might include a MIPS R3000 core with 4 Kbytes of instruction cache and 4 Kbytes of data cache running at 100 MHz, or any other host processor known in the art. In the described exemplary embodiment, this MIPS core supports voice over IP (VoIP) protocol stacks, jitter buffer management, and an applications program.

The SDRAM interface 1208 provides an interface between an external SDRAM and the host processor 1206 and the DSP subsystem 1204 under the control of the DMA arbiters 1212. In the described exemplary embodiment, the SDRAM interface 1208 supports a 100 MHz and/or. 8 or 16-bit wide SDRAM from 2 up to 32 Mbyte configurations. The SDRAM interface 1208 can be connected to the ISB 221. The host processor 1206 and the DSP subsystem 1204 can access the SDRAM 1234 through this bus.

The EBI 1210 provides access between components on the ISB and external devices that uses a standard bus interface. FLASH memory 1236 and LCD (not shown) can be connected via this interface. The DMA arbiters 1212 can provide a mechanism for transferring information between the EBI 1210 and the SDRAM 1234.

In the described exemplary embodiment, the DMA arbiters 1212 are responsible for performing direct memory transfer between the SDRAM interface 1208 and other components on the ISB. These components might include an Ethernet switch, a TDM interface, and a CODEC interface. In at least one embodiment, both the host processor 1206 and the DSP subsystem 204 can master the associated DMA transfers. This provides the flexibility of allowing the TDM and codec samples to be processed by either the host processor 1206 or the DSP subsystem 1204.

In the described exemplary embodiment, the codec supports three voice channels. Three analog-to-digital converters (ADC) and three digital-to-analog converters (DAC) are used to eliminate the need for an analog switch that would otherwise be needed to share the codec between multiple interfaces. The described exemplary codec also includes contains a set of bidirectional FIFOs (one for each codec) for buffering the samples while the DMA arbiter 1212 is used to transfer the samples between these FIFOs and the SDRAM. Chained DMA arbiters can be set up by either the host processor 1206 or the DSP subsystem to transfer, by way of example, 5 ms worth of samples each processing interval. Maskable interrupts may also be provided to both the host processor 1206 and the DSP subsystem 1204 to signal completion of the DMA transfer. This allows whichever processor responsible for processing the media samples to control the DMA arbiter 1212. In the described exemplary embodiment, the depth of these FIFOs are 32 samples (64 bytes) long, and the codecs sample at 96 kHz such that 5 ms is equivalent to 480 samples. The DSP subsystem 1204 is responsible for resampling from 96 kHz to 8 or 16 kHz and vice versa.

The TDM interface 1216 supports interoperation with industry standard PCM highway and ISDN Oriented Modular interface (IOM-2). To support ISDN, the TDM interface 1216 includes HDLC controllers for D-channel interfaces. The DMA arbiters 1212 can also be used to transfer TDM samples or data to and from the SDRAM 234. Maskable interrupts can be provided to both the host processor 1206 and the DSP subsystem 1204 to signal completion of the DMA transfer. This allows whichever processor responsible for processing the TDM samples/data to program the DMA arbiter 1212 for the next transfer. Similar to the codec interface, a set of 64 byte deep FIFOs can be used to buffer the samples from a TDM bus 1238 to facilitate the DMA transfer.

A three-port Ethernet switch 1218 can be used to integrate three full-duplex capable Media Access Controllers (MACs), a serial Management Port, an address resolution engine, a non-blocking switch controller, 64 K of internal switch memory, and a set of Management Information Base (MIB) statistics registers. Two transceivers 1220a, 1220b can be used to perform the functions for 100Base-T Ethernet in full- or half-duplex mode over Category (CAT) 5 twisted pair cable and 10Base-T Ethernet in full- or half-duplex mode over CAT 3, 4, or 5 twisted pair cable. The transceivers can support Auto MDI/MDIX detection to allow the use of any cable type in either port.

The DSP Subsystem—At the heart of the DSP subsystem is the DSP 1222. The described exemplary embodiment of the DSP 1222 can be a 140 MHz DSP capable of supporting a wide range of vocoders, acoustic echo cancellation for full duplex speakerphone, and a variety of telephony algorithms (e.g., Dual Tone Multi-Frequency (DTMF) and Call Progress Tones).

The ISB-MXU bus interface 1233 can be used to allow the DSP 1222 to have direct access to any of the resources attached to the ISB 221. This provides a mechanism for the DSP 1222 to access the SDRAM 1234 and the FLASH ROM 1236 for bootloading the DSP 1222. The DSP 1222 may also have control of the DMA transfer over the ISB with respect to the codec, TDM interface 1216, and the DSP memory FIFOs 1228 via the ISB-MXU bus interface 1233.

Two banks of 16-bit 8 deep mailboxes 1224, one bank for each direction, can be provided for communication between the host processor 1206 and the DSP 1222. An interrupt can be generated when the last mailbox in the bank is written to.

In the described exemplary embodiment, there are two DMA channels associated with the DSP subsystem 1204. One for arbitrating the DMA transfer from the host processor 1206 to an SDRAM DSP FIFO 1228a to either the DSP Program RAM 1230 or the DSP Data RAM 1232. A second DMA channel can be provided for arbitrating the DMA transfer from the DSP Program RAM 1230 or the DSP Data RAM 1232 to the DSP-SDRAM FIFO 1228b. These DMA channels can be used in concert with the ISB DMA channels to transfer code and data between the DSP subsystem 1204 and the SDRAM 1234.

The DSP memory FIFOs 1228 can be, by way of example, two 64-byte DSP memory FIFOs used for buffering the transfer of code and data between the DSP subsystem 1204 and the SDRAM 1234. The SDRAM-DSP FIFO 1228a can be used to buffer program code or data transferred from the SDRAM 1234 to the DSP Program RAM 1230 or the DSP Data RAM 1232. The DSP-SDRAM FIFO 1228b can be used to buffer data from the DSP Program RAM 1230 or the DSP Data RAM 1232 to the SDRAM 1234. In the host processor 1206 to DSP 1222 direction, information is first transferred from the SDRAM 1234 into the SDRAM-DSP FIFO 1228a by the DMA arbiters 1212. Another DMA transfer is used to move information from the SDRAM-DSP FIFO 1228a into either the DSP Program RAM 1230 or the DSP Data RAM 1232. Similarly, in the DSP 1222 to host processor 1206 direction, data is first transferred from the DSP Program RAM 1230 or the DSP Data RAM 1232 into the DSP-SDRAM FIFO 1228b. A second DMA transfer is used to move data out of the DSP-SDRAM FIFO 1228b and into the SDRAM 1234. All DMA channels are chainable. The descriptor rings for the DSP memory FIFOs 1228a, 1228b to and from the DSP Program RAM 1230 and the DSP Data RAM 1232 may reside on the DSP data memory. Descriptor rings for all other DMA channels can reside on the SDRAM 1234.

In the described exemplary embodiment, the DSP Program RAM 1230 can be a 40 Kbyte block of single port program memory available to the DSP 1222 for code storage. The DSP Program RAM can be divided into two memory blocks (i.e., 24 Kbyte and 16 Kbyte respectively), to allow for code execution on one bank while a DMA transfer is occurring on the other bank. The DSP 1222 may be halted whenever a DMA transfer to the DSP Program RAM 1230 is taking place. Similarly, the DSP Data RAM 1232 can be a 32 Kbyte block of single port data memory available to the DSP 1222 for data storage. The DSP Data RAM can be divided into two 16 Kbyte memory blocks to allow the DSP 1222 to access data from one bank while a DMA transfer is occurring on the other bank. The DSP 1222 may be halted whenever a DMA transfer to or from the DSP Data RAM 1232 is taking place.

The DSP Program and Data RAM 1230, 1232 can be mapped into the low 32K address sections. The upper 32K address sections can be mapped onto ISB address space in 32 Kword (64 Kbyte) pages. A page register may be available to select a particular memory page. Upon reset, the page register can be initialized such that part of the FLASH ROM 1236 will appear in the DSP paged address space. Since the DSP reset address is located in that space, this will allow the DSP to execute from the FLASH ROM 1236 immediately after reset. The DSP can be initialized to insert an appropriate number of wait states to allow proper access to the FLASH ROM 1236.

Figure 13:
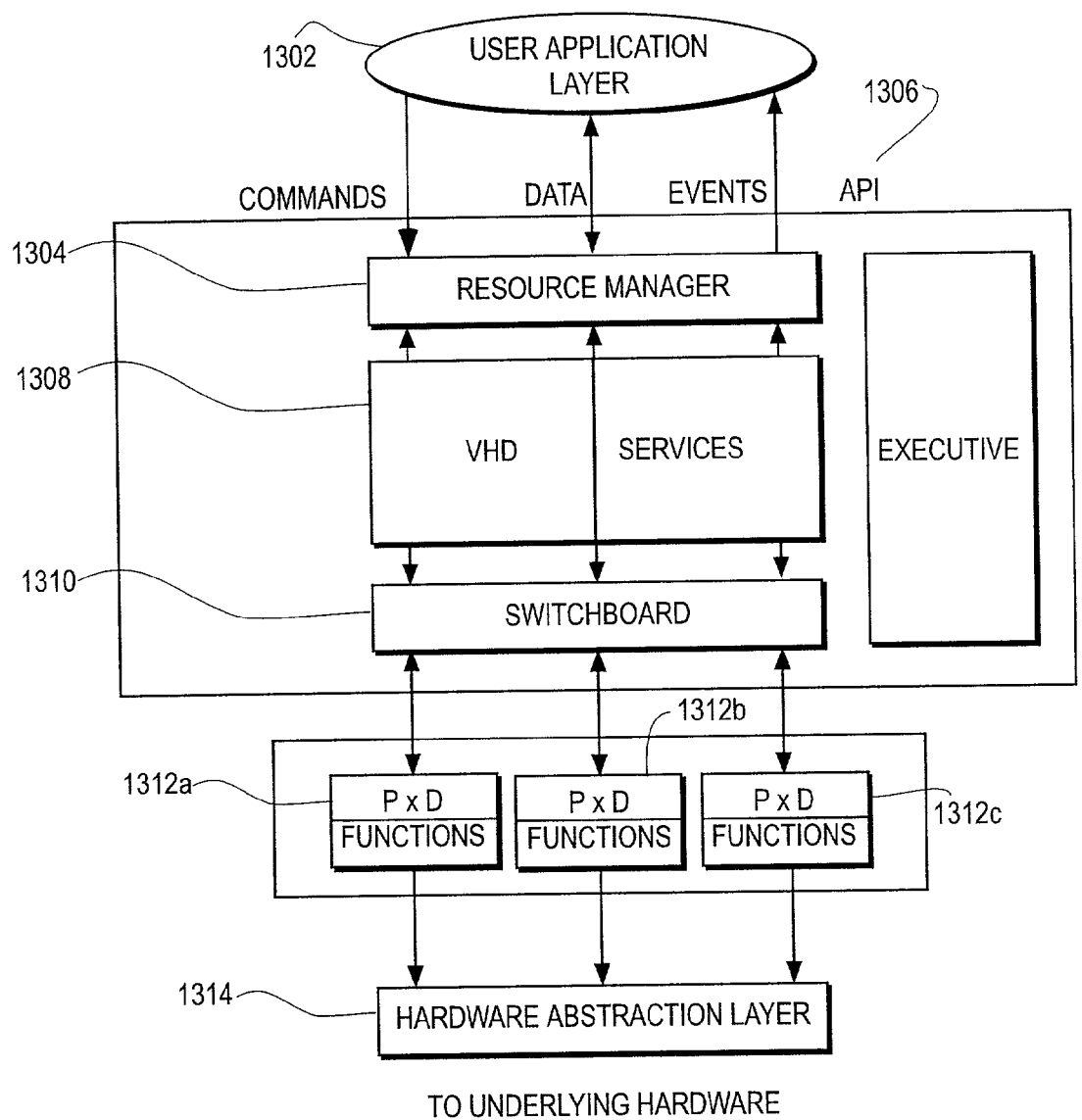
FIG. 13 is a block diagram of the software architecture operating on a hardware platform in accordance with an exemplary embodiment.

Network telephone software architecture—An exemplary multi-layer software architecture is shown in FIG. 13. A user application layer 1302 provides overall executive control and system management. A resource manager 1304 receives commands from, forwards events to, and exchanges data with the user application layer 1302. An application programming interface 1306 (API) provides a software interface between the user application layer 1302 and the resource manager 1304. The resource manager 1304 manages the internal/external program and data memory. In addition, the resource manager dynamically allocates resources, performs command routing as well as other general purpose functions.

The resource manager 1304 coordinates the services between a virtual device driver (VHD) 1308. The VHD is a collection of software objects that control the operation of and provide the facility for real time signal processing. The VHD 1308 includes an inbound and outbound media queue (not shown) and a library of signal processing services. The VHD 1308 is a complete self-contained software module for processing a single channel with a number of different telephony devices. Multiple channel capability can be achieved by adding VHDs. The resource manager 1304 dynamically controls the creation and deletion of VHDs and services.

A switchboard 1310 dynamically inter-connects several physical drivers (PXDs) 1312a, 1312b, 1312c with the VHD 1308. Each PXD 1312a, 1312b, 1312c is a collection of software objects which provide signal conditioning for one external telephony connection. For example, a PXD may provide volume and gain control for signals from a telephony device prior to communication with the switchboard 1310. Multiple telephony functionalities can be supported on a single channel by connecting multiple PXDs, by way of example, one for the handset and one for the speaker phone, to the VHD 1308 via the switchboard 1310. Connections within the switchboard can be are managed by the user application layer 1302 via a set of API commands to the resource manager 1304. The number of PXDs and VHDs is expandable, and limited only by the memory size and the MIPS (millions instructions per second) of the underlying hardware.

A hardware abstraction layer (HAL) 1314 interfaces directly with the underlying hardware and exchanges telephony signals between the telephony connections and the PXDs. The HAL 1314 includes basic hardware interface routines, including hardware initialization, target hardware control, and hardware control interface routines. The hardware initialization routine is invoked by the user application layer 1302 to initiate the initialization of the signal processing system. The hardware initialization sets up the internal registers of the signal processing system for memory organization, interrupt handling, timer initialization, and hardware configuration. Target hardware initialization involves the initialization of all hardware devices and circuits external to the signal processing system. The HAL 1314 is a physical firmware layer that isolates the communications software from the underlying hardware. This methodology allows the communications software to be ported to various hardware platforms by porting only the affected portions of the HAL 1314 to the target hardware.

In the described exemplary embodiment, VHD is used to provide a single channel of operation and provide the signal processing services for transparently managing voice across a variety of packet based networks. More particularly, the VHD 1308 encodes and packetizes voice, DTMF, and Call Progress Tones received from various telephony connections and transmits the packets to the user application layer 1302. In addition, the VHD 1308 disassembles voice, DTMF, and Call Progress Tones from the user application layer 1302, decodes the packets into signals, and transmits the signals to the telephony connections.

In the described exemplary embodiment, the user application layer does not need to manage any service directly. The user application layer 1302 manages the session using high-level commands directed to the VHD 1308, which in turn directly runs the services. However, the user application layer can access more detailed parameters of any service if necessary to change, by way of example, default functions for any particular application.

In operation, the user application layer 1302 opens the VHD 1308 and connects it to the appropriate PXDs. The user application layer 1302 then may configure various operational parameters of the VHD, including, among others, numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)—40, 32, 24, 16 kbit/s Adaptive Differential Pulse Code Modulation (ADPCM)), G.729A 8 kbps (Annex A (11/96) to ITU Recommendation G.729—Coding of speech at 8 kbit/s using conjugate structure algebraic-code-excited linear-prediction (CS-ACELP) B Annex A: Reduced complexity 8 kbit/s CS-ACELP speech codec), and G.723 5.3/6.3 kbps (ITU Recommendation G.723.1 (03/96)—Dual rate coder for multimedia communications transmitting at 5.3 and 6.3 kbit/s). The contents of each of the foregoing ITU Recommendations being incorporated herein by reference as if set forth in full. The user application layer 1302 then loads an appropriate signaling service (not shown) into the VHD 1308, configures it and sets the VHD 1308 to the On-hook state.

In response to events from the signaling service (not shown) via a headset, or signal packets from the far end, the user application layer 1302 will set the VHD 1308 to the off-hook state. In an exemplary embodiment, if the signaling service event is triggered by the headset, or other near end telephony connection, a packet tone exchange will generate dial tone. Once a DTMF tone is detected, the dial tone is terminated. The DTMF tones are packetized and forwarded to the user application layer for transmission on the network. The packet tone exchange could also play ringing tone back to the network telephone (when a far end telephony device is being rung), and a busy tone if the far end telephony device is unavailable. Other tones may also be supported to indicate all circuits are busy, or an invalid sequence of DTMF digits were entered on the network telephone.

Once a connection is made between the network telephone and a far end telephony device, the resource manager 1304 invokes the voice mode. The PXDs 1312*a*, 1312*b*, 1312*c*, for the voice mode includes echo cancellation, gain, and automatic gain control. The VHD invokes numerous services in the voice mode including call discrimination, packet voice exchange, and packet tone exchange. These VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

Figure 14:
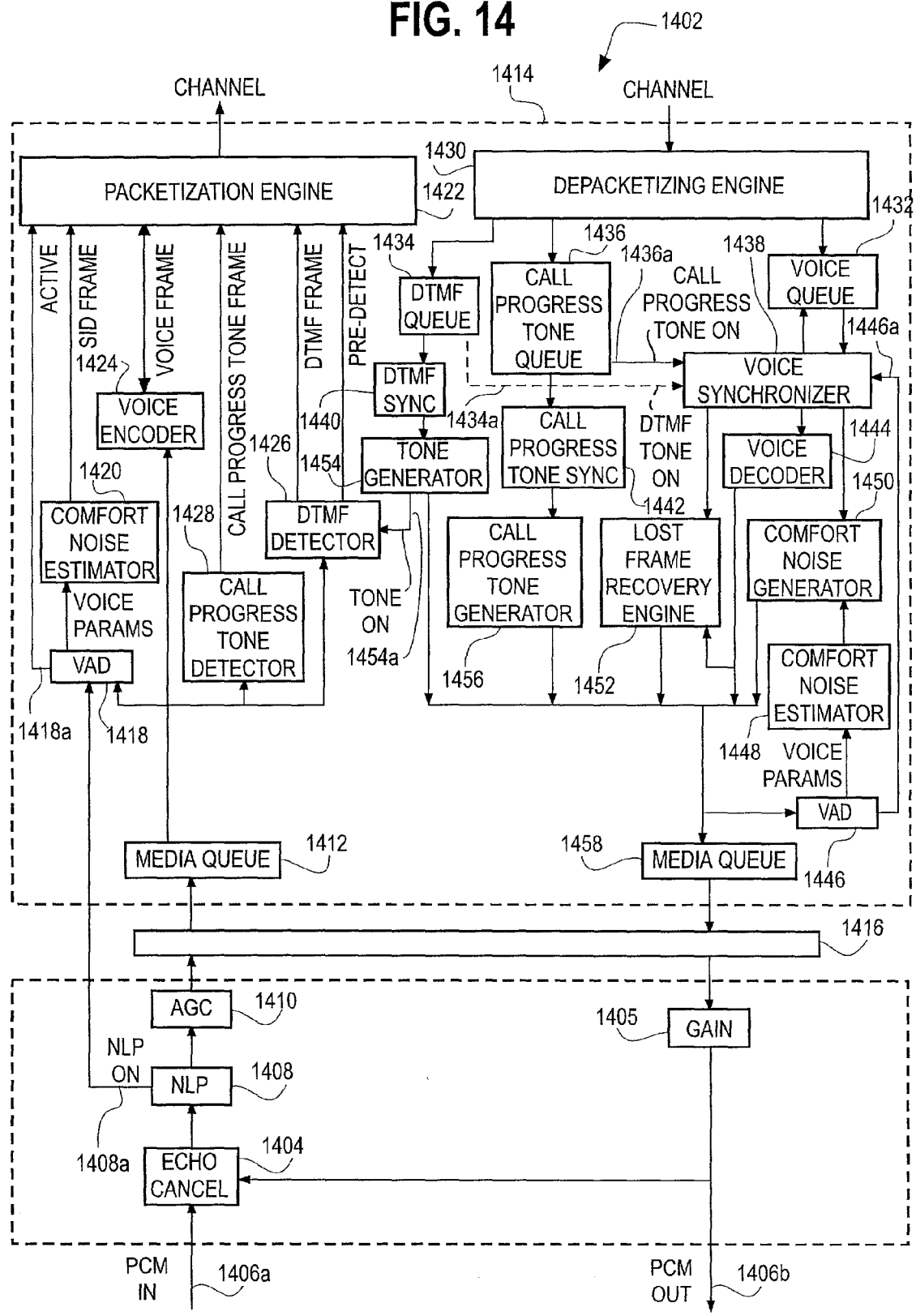
FIG. 14 is a system block diagram of a signal processing system operating in a voice mode in accordance with an exemplary embodiment of the present invention.

The services invoked by the VHD in the voice mode and the associated PXD is shown schematically in FIG. 14. In the described exemplary embodiment, the PXD 1402 provides two way communication with the handset for the network telephone.

The incoming signal from the handset can be initially processed by the PXD 1402 to remove the far end echos. As the name implies, echos in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 1404 is used to remove echoes from far end speech present on the incoming signal before routing the incoming signal back to the far end user. The echo canceller 1404 samples an outgoing signal 1406*b* from the far end user, filters it, and combines it with the incoming signal 1406*a*. The echo canceller 1404 may be followed by a non-linear processor (NLP) 1408 which can mute the digital voice samples when far end speech is detected in the absence of near end speech. The echo canceller 1404 may also inject comfort noise which in the absence of near end speech may be roughly at the same level as the true background noise or at a fixed level.

After echo cancellation, the power level of the digital voice samples is normalized by an automatic gain control (AGC) 1410 to ensure that the conversation is of an acceptable loudness. Alternatively, the AGC can be performed before the echo canceller, however, this approach would entail a more complex design because the gain 1405 would also have to be applied to the sampled outgoing signal 1406*b*. In the described exemplary embodiment, the AGC 1410 is designed to adapt slowly, although it should adapt fairly quickly if overflow or clipping is detected. The AGC adaptation should be held fixed if the NLP 1408 is activated. After AGC, the digital voice samples are placed in a media queue 1412 in the VHD 1414 via a switchboard 1416.

Typical telephone conversations have as much as sixty percent silence or inactive content. Therefore, high bandwidth gains can be realized if digital voice samples are suppressed during these periods. A voice activity detector (VAD) 1418 can be used to accomplish this function. The VAD 1418 attempts to detect digital voice samples that do not contain active speech. During periods of inactive speech, a comfort noise estimator 1420 couples silence identifier (SID) packets to a packetization engine 1422. The SID packets contain voice parameters that allow the reconstruction of the background noise at the far end.

From a system point of view, the VAD 1418 may be sensitive to the change in the NLP 1408. For example, when the NLP 1408 is activated, the VAD 1418 may immediately declare that voice is inactive. In that instance, the VAD 1418 may have problems tracking the true background noise level. If the echo canceller 1404 generates comfort noise during periods of inactive speech, it may have a different spectral characteristic from the true background noise. The VAD 1418 may detect a change in noise character when the NLP 1408 is activated (or deactivated) and declare the comfort noise as active speech. For these reasons, the VAD 1418 should be disabled when the NLP 1408 is activated. This is accomplished by a "NLP on" message 1408*a* passed from the NLP 1408 to the VAD 1418.

A voice encoder 1424 can be a straight 16 bit PCM encoder or any voice encoder which supports one or more of the standards promulgated by ITU. The encoded digital voice samples are formatted into a voice packet (or packets) by the packetization engine 1422. These voice packets are formatted according to an applications protocol. The voice encoder 1424 is invoked only when digital voice samples with speech are detected by the VAD 1418. Since the packetization interval may be a multiple of an encoding interval, both the VAD 1418 and the packetization engine 1422 should cooperate to decide whether or not the voice encoder 1424 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 1418 passing an "active" flag 1418a to the packetization engine 1422, and the packetization engine 1422 controlling whether or not the voice encoder 1424 is invoked.

In the described exemplary embodiment, the VAD 1418 is applied after the AGC 1410. This approach provides optimal flexibility because both the VAD 1418 and the voice encoder 1424 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

A DTMF detector 1426 determines whether or not there is a DTMF signal from the keypad of the network telephone. The DTMF detector 1426 also provides a pre-detection flag 1426a which indicates whether or not it is likely that the digital voice sample might be a portion of a DTMF signal. If so, the pre-detection flag 1426a is relayed to the packetization engine 1422 instructing it to begin holding voice packets. If the DTMF detector 1426 ultimately detects a DTMF signal, the voice packets are discarded, and the DTMF signal is coupled to the packetization engine 1422. Otherwise the voice packets are ultimately released from the packetization engine 1422. The benefit of this method is that there is only a temporary impact on voice packet delay when a DTMF signal is pre-detected in error, and not a constant buffering delay. Whether voice packets are held while the pre-detection flag 1426a is active could be adaptively controlled by the user application layer.

Similarly, a call progress tone detector 1428 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 1428 monitors the call progress state, and forwards a call progress tone signal to the packetization engine 1422 to be packetized and transmitted across the network. The call progress tone detector may also provide information regarding the network telephone hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the VHD 1414 essentially performs the inverse operation of the encoding system. The decoding system of the VHD 1414 comprises a depacketizing engine 1430, a voice queue 1432, a DTMF queue 1434, a call progress tone queue 1436, a voice synchronizer 1438, a DTMF synchronizer 1440, a call progress tone synchronizer 1442, a voice decoder 1444, a VAD 1446, a comfort noise estimator 1448, a comfort noise generator 1450, a lost packet recovery engine 1452, a tone generator 1454, and a call progress tone generator 1456.

The depacketizing engine 1430 identifies the type of packets received from the network (i.e., voice packet, DTMF packet, call progress tone packet, SID packet), transforms them into frames which are protocol independent. The depacketizing engine 1430 then transfers the voice frames (or voice parameters in the case of SID packets) into the voice queue 1432, transfers the DTMF frames into the DTMF queue 1434 and transfers the call progress tones into the call progress tone queue 1436. In this manner, the remaining tasks are, by and large, protocol independent.

A jitter buffer is utilized to compensate for network impairments such as delay jitter caused by packets not arriving at the same time or in the same order in which they were transmitted. In addition, the jitter buffer compensates for lost packets that occur on occasion when the network is heavily congested. In the described exemplary embodiment, the jitter buffer includes a voice synchronizer 1438 that operates in conjunction with a voice queue 1432 to provide an isochronous stream of voice frames to the voice decoder 1444.

Sequence numbers embedded into the voice packets at the far end can be used to detect lost packets, packets arriving out of order, and short silence periods. The voice synchronizer 1438 can analyze the sequence numbers, enabling the comfort noise generator 1450 during short silence periods and performing voice frame repeats via the lost packet recovery engine 1452 when voice packets are lost. SID packets can also be used as an indicator of silent periods causing the voice synchronizer 1438 to enable the comfort noise generator 1450. Otherwise, during far end active speech, the voice synchronizer 1438 couples voice frames from the voice queue 1432 in an isochronous stream to the voice decoder 1444. The voice decoder 1444 decodes the voice frames into digital voice samples suitable for transmission to the handset. The output of the voice decoder 1444 (or the comfort noise generator 1450 or lost packet recovery engine 1452 if enabled) is written into a media queue 1458 for transmission to the PXD 1402.

The comfort noise generator 1450 provides background noise to the near end user during silent periods. If the protocol supports SID packets, (and these are supported for VTOA, FRF-11, and VoIP), the comfort noise estimator at the far end encoding system should transmit SID packets. Then, the background noise can be reconstructed by the near end comfort noise generator 1450 from the voice parameters in the SID packets buffered in the voice queue 1432. However, for some protocols, the SID packets are optional, and other far end users may not support SID packets at all. In these systems, the voice synchronizer 1438 must continue to operate properly. In the absence of SID packets, the voice parameters of the background noise at the far end can be determined by running the VAD 1446 at the voice decoder 1444 in series with a comfort noise estimator 1448.

Preferably, the voice synchronizer 1438 is not dependent upon sequence numbers embedded in the voice packet. The voice synchronizer 1438 can invoke a number of mechanisms to compensate for delay jitter in these systems. For example, the voice synchronizer 1438 can assume that the voice queue 1432 is in an underflow condition due to excess jitter and perform packet repeats by enabling the lost frame recovery engine 1452. Alternatively, the VAD 1446 at the voice decoder 1444 can be used to estimate whether or not the underflow of the voice queue 1432 was due to the onset of a silence period or due to packet loss. In this instance, the spectrum and/or the energy of the digital voice samples can be estimated and the result 1446a fed back to the voice synchronizer 1438. The voice synchronizer 1438 can then invoke the lost packet recovery engine 1452 during voice packet losses and the comfort noise generator 1450 during silent periods.

When DTMF packets arrive, they are depacketized by the depacketizing engine 1430. DTMF frames at the output of the depacketizing engine 1430 are written into the DTMF queue 1434. The DTMF synchronizer 1440 couples the DTMF frames from the DTMF queue 1434 to the tone generator 1454. Much like the voice synchronizer, the DTMF synchronizer 1440 is employed to provide an isochronous stream of DTMF frames to the tone generator 1454. Generally speaking, when DTMF packets are being transferred, voice frames should be suppressed. To some extent, this is protocol dependent. However, the capability to flush the voice queue 1432 to ensure that the voice frames do not interfere with DTMF generation is desirable. Essentially, old voice frames which may be queued are discarded when DTMF packets arrive. This will ensure that there is a significant inter-digit gap before DTMF tones are generated. This is achieved by a "tone present" message 1434*a* passed between the DTMF queue and the voice synchronizer 1432. The tone generator 1454 converts the DTMF signals into a DTMF tone suitable for a standard digital or analog telephone. The tone generator 1454 overwrites the media queue 1458 to prevent leakage through the voice path and to ensure that the DTMF tones are not too noisy.

There is also a possibility that DTMF tone may be fed back as an echo into the DTMF detector 1426. To prevent false detection, the DTMF detector 1426 can be disabled entirely (or disabled only for the digit being generated) during DTMF tone generation. This is achieved by a Atone on@ message 1454*a* passed between the tone generator 1454 and the DTMF detector 1426. Alternatively, the NLP 1408 can be activated while generating DTMF tones.

When call progress tone packets arrive, they are depacketized by the depacketizing engine 1430. Call progress tone frames at the output of the depacketizing engine 1430 are written into the call progress tone queue 1436. The call progress tone synchronizer 1442 couples the call progress tone frames from the call progress tone queue 1436 to a call progress tone generator 1456. Much like the DTMF synchronizer, the call progress tone synchronizer 1442 is employed to provide an isochronous stream of call progress tone frames to the call progress tone generator 1456. And much like the DTMF tone generator, when call progress tone packets are being transferred, voice frames should be suppressed. To some extent, this is protocol dependent. However, the capability to flush the voice queue 1432 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 1436*a* passed between the call progress tone queue 1436 and the voice synchronizer 1438.

The call progress tone generator 1456 converts the call progress tone signals into a call progress tone suitable for a standard digital or analog telephone. The call progress tone generator 1456 overwrites the media queue 1458 to prevent leakage through the voice path and to ensure that the call progress tones are not too noisy.

The outgoing signal in the media queue 1458 is coupled to the PXD 1402 via the switchboard 1416'. The outgoing signal is coupled to an amplifier 1460 before being outputted on the output line 1406*b*.

An exemplary voice signal processor is disclosed U.S. patent application Ser. No. 09/522,185, entitled "Voice and Data Exchange over a Packet Based Network," the contents of which is hereby incorporated by reference as though fully set forth herein.

Referring again to FIG. 2, the exemplary software architecture runs most of the software on the host processor 1206. By running most of the software on the host processor 1206 (rather than the DSP 1222) memory savings may be achieved. The DSP 1222 will be relegated to perform repeated list of tasks as instructed by the host processor 1206. The internal DSP Program RAM 1230 and DSP Data RAM 1232 serve as cache while the external SDRAM 1234 is used for bulk storage by the DSP 1222. As discussed earlier, DMA paths between the SDRAM 1234 and the DSP Program RAM 1230 and DSP Data RAM 1232 exist to allow code/data swapping at a high rate. Since the DSP 1222 is halted during DMA transfers, the DMA transfer rate should be high enough that the DSP 1222 has sufficient cycles remaining for executing various tasks. In the described exemplary embodiment, the DSP 1222 will control the DMA transfer between the codec 1214 and the SDRAM 1234, and also between the TDM interface 1216 and the SDRAM 1234.

Because no multi-task scheduling is done on the DSP 1222, all tasks should run to completion on a single thread rate, by way of example, 5 ms. The DSP 1222 can be driven by sample interrupts that have periodicity of 5 ms (480 96 kHz samples). Signal processing tasks which naturally runs at greater than the 5 ms rate such as G.729abe (10ms) and G.723.1a (30 ms) should be broken down into segments with a run rate of 5 ms in order to even out computational load. Accordingly, G.729abe should be partitioned into two segments and G.723.1a should be partitioned into six segments.

The DSP 1222 may include two ingress and three egress media buffers allocated statically. Each buffer will hold 40 8 kHz samples. The individual task (G.729 or G.723 wrapper function) is responsible for buffering the samples to the required frame size prior to processing. This avoids the need for maintaining media queues and the code associated it.

Ingress codec samples are transferred from the codec 1214 into the SDRAM 1234. These samples are then transferred into a resampling buffer through the DSP memory FIFOs 1228 under DSP control. The resulting 8 kHz samples are then placed in the media buffer. Egress samples flow in the reverse direction. They are resampled first and then transferred from the media buffer through the DSP memory FIFOs 1228 into the SDRAM 1234. Another DMA transfer is performed to move the samples from the SDRAM 1234 into the codec 1214.

The DSP 1222 can maintain two ingress and three egress data message queues also allocated statically. Two sets of queues are used to support the two voice channels during three-way conferencing. The third egress queue is used to support a paging channel.

In the egress direction, when a data message (packet) is available to be sent to the DSP 1222, a mailbox message is first sent to the DSP 1222 with the address and length of the message. The DSP 1222 is then responsible for setting up the DMA arbiters 1212 to transfer the message from the SDRAM 1234 into the DSP Program RAM 1230 and the DSP Data RAM 1232. For the ingress direction, when a data message (packet) is available to be sent to the host processor 1206, the DSP 1222 determines the next available buffer in the SDRAM 1234. A mailbox message is then sent to the host processor 1206 that will indicate the address and length of the message. It is assumed that the ingress data message buffer addresses are either pre-determined or loaded into the DSP 1222 at initialization time.

In the described exemplary embodiment, transfer of data messages to and from the SDRAM should be done at 5 ms boundary at the same time when samples and code are transferred. This will allow the DMA to be chained and hence reduce overhead.

The mailboxes 1224 provide a direct communication path between the host processor 1206 and the DSP 1222. The mailboxes can be used for communicating the task list, status or indication (such as tone detect) type information. Transfer of packet data such as compressed speech will be via the DSP memory FIFOs 1228. In this case, the recipient needs to be informed of the location of the packets via a mailbox message.

The task list can contain specifications for media channel, instance memory address (on the SDRAM), instance memory DSP address offset, code image source address, code image destination address offset, constants source address, constants destination address offset and task parameters (previously registers setting).

An executive should be resident on the DSP 1222 to process the task list, handle the DMA control, handle mailbox messaging, perform switchboard function for conferencing, resampling of media samples between 96 and 8 or 16 kHz, and transfer media samples between the DSP and the codec. It can also include buffer and queue management functions required for supporting the above functionality.

In order to minimize the interruptions on the host processor 1206, a list of tasks could be scheduled for the DSP 1222 to be processed repeatedly. For example, when a G.723.1a call is being conferenced with a G.728 call, then the following task list could be sent to the DSP:

Run echo cancellation with 32 ms tail;
Run DTMF detection;
Run G.723.1a for the main channel (1);
Run G.728 for the conferenced channel (2);
Add channel 1 egress media queue to codec channel 1, place result in channel 2 ingress media queue; and
Add channel 2 egress media queue to codec channel 1, place result in channel 1 ingress media queue.

Each entry consists of specification of task specific parameters as well as specification of the media channel, SDRAM address locations for the instance, code image, and constants memory. A destination address offset is required such that wrapper function may be loaded separately from the sub-tasks that it calls. There will be multiple code image and constant source address offsets for tasks such as G.729 and G.723.1 where processing have been partitioned. These addresses will be kept in a table. The DSP can maintain a segment counter for each channel and load the appropriate code image/constant segments indexed into the address table by the counter. Because G.729 and G.723.1 may require loading of different segments depending on whether there is active voice, at the decision point, the particular G.729 or G.723.1 wrapper function is allowed to modify the segment counter such that the appropriate segment branch takes place.

For each task entry, the DSP will set up the DMA transfers. At the completion of the code and data transfer, it shall begin execution at a pre-determined entry point (perhaps by making the first two words in the program transfer a go to instruction). After completion of the given task, it shall be responsible for transferring the instance data back into the SDRAM.

After all task entries have been processed, the executive will idle waiting for the next sample (5 ms) interrupts to occur, process the samples, and repeat the task list processing. The task list needs to be changed only when the call state has changed, i.e. the conferenced party has joined or departed, the current call has ended, etc.

All voice encoder, and other functions running on the DSP should have new wrappers since most of the signal processing is not performed at the DSP level. These wrappers should be aware of where and how to obtain pointers for the media samples and buffer for compressed speech. For G.729 and G.723, the wrappers will also be responsible for buffering up the 5 ms samples into a complete frame.

Although certain exemplary embodiments of the present invention have been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive. It is therefore intended that the following claims be interpreted as covering all such alterations and modifications as fall within the true spirit and scope of the invention.

The invention claimed is:

1. An apparatus for reducing the memory footprint of a first processor device, the apparatus comprising:
   a segment of program code which is split into portions including at least one controlling piece and at least one separate working piece;
   a storage area for storing certain pieces of the program code;
   a first memory area associated with the first processor device for receiving certain portions of the program code; and
   a hardware transfer mechanism for efficiently linking the storage area with the first memory area,
   wherein the memory footprint of the first processor device is reduced by locating certain controlling pieces of the program code in the storage area, and transferring only certain working pieces of the program code in the first memory area.

2. The apparatus of claim 1, wherein the storage area includes a second memory area associated with second processor device.

3. The apparatus of claim 2, wherein the first processor device includes a high-MIPS processor device having higher-cost memory.

4. The apparatus of claim 3, wherein the second processor device include a low-MIPS processor device having lower-cost memory.

5. The apparatus of claim 3, wherein the high-MIPS processor device includes a digital signal processor (DSP) device.

6. The apparatus of claim 4, wherein the low-MIPS processor device includes a general microcontroller unit (MCU) device.

7. The apparatus of claim 2, wherein the working piece is further split into code phases and associated data blocks, which are arranged into code and data segments.

8. The apparatus of claim 7, wherein a store exists in the second memory area for the segments.

9. The apparatus of claim 8, wherein further included is a segment manager which copies the segments between the store and the first memory area on an as-needed basis.

10. The apparatus of claim 9, wherein the segment manager utilizes hardware acceleration to achieve efficient transfers.

11. The apparatus of claim 9, wherein the segment manager is used to schedule segment management from the first processor.

12. The apparatus of claim 9, wherein the segment manager is used to schedule segment management from the second processor.

13. An method for reducing the memory footprint of a first processor device, the method comprising the steps of:
- splitting a segment of program code into portions including at least one controlling piece and at least one separate working piece;
- storing certain portions of the program code in a storage area;
- receiving certain portions of the program code in a first memory area associated with the first processor device; and
- linking the storage area with the first memory area using an efficient hardware transfer mechanism,
- wherein the memory footprint of the first processor device is reduced by locating certain controlling pieces of the program code in the storage area, and only certain working pieces of the program code in the first memory area.

14. The method of claim 13, wherein the storage area includes a second memory area associated with second processor device.

15. The method of claim 14, wherein the first processor device includes a high-MIPS processor device having higher-cost memory.

16. The method of claim 15, wherein the second processor device include a low-MIPS processor device having lower-cost memory.

17. The method of claim 15, wherein the high-MIPS processor device includes a digital signal processor (DSP) device.

18. The method of claim 16, wherein the low-MIPS processor device includes a general microcontroller unit (MCU) device.

19. The method of claim 14, wherein the steps further include: splitting the working piece into code phases and associated data blocks, and arranging them into code and data segments.

20. The method of claim 19, wherein the steps further include creating a store in the second memory area for the segments.

21. The method of claim 19, wherein the steps further include utilizing a segment manager to copy the segments between the store and the first memory area on an as-needed basis.

22. The method of claim 21, wherein the segment manager further includes the step of utilizing hardware acceleration to achieve efficient transfers.

23. The method of claim 21, wherein the steps further include scheduling the segment management, using the segment manager, from the first processor.

24. The method of claim 21, wherein the steps further include scheduling the segment management, using the segment manager, from the second processor.

25. A distributed signal processing framework for reducing the memory footprint of a digital signal processing device, the framework comprising:
- at least one signal processing algorithm, the algorithm being split into a controlling piece and at least one separate processing piece;
- a low-MIPS processor device having a high-memory footprint, whereby the controlling piece is stored and runs on the low-MIPS processor device;
- a high-MIPS processor having a low-memory footprint, whereby at least one of the separate processing pieces is stored and runs on the high-MIPS processor device; and
- a hardware transfer mechanism for efficiently linking the pieces through the distributed framework.

* * * * *